(12) United States Patent
Kisley et al.

(10) Patent No.: US 12,717,110 B2
(45) Date of Patent: Aug. 25, 2026

(54) APPARATUS AND METHOD FOR EXPANSION MICROSCOPY

(71) Applicant: CASE WESTERN RESERVE UNIVERSITY, Cleveland, OH (US)

(72) Inventors: Lydia Kisley, Cleveland, OH (US); Andrew Maytin, Cleveland, OH (US); Vignesh Venkataramani, Cleveland, OH (US); Zhanda Chen, Missouri City, TX (US); Cole Reinholt, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 324 days.

(21) Appl. No.: 18/631,882

(22) Filed: Apr. 10, 2024

(65) Prior Publication Data

US 2025/0004238 A1 Jan. 2, 2025

Related U.S. Application Data

(60) Provisional application No. 63/495,118, filed on Apr. 10, 2023.

(51) Int. Cl.
*G02B 7/00* (2021.01)

(52) U.S. Cl.
CPC .................................... *G02B 7/00* (2013.01)

(58) Field of Classification Search
CPC ............... G02B 7/00; G01N 1/28; G01N 1/36
See application file for complete search history.

(56) References Cited

U.S. PATENT DOCUMENTS

| | | | | |
|---|---|---|---|---|
| 2009/0139311 A1* | 6/2009 | Lehto | B01L 7/00 73/864.91 |
| 2017/0276578 A1 | 9/2017 | Vaughan et al. | |
| 2022/0074829 A1 | 3/2022 | Suzuki et al. | |
| 2023/0116191 A1 | 4/2023 | Anseth et al. | |
| 2023/0304905 A1 | 9/2023 | Tillberg et al. | |
| 2025/0123260 A1* | 4/2025 | Solorio | G01N 3/04 |

* cited by examiner

*Primary Examiner* — Kevin K Pyo
(74) *Attorney, Agent, or Firm* — Tarolli, Sundheim, Covell & Tummino LLP

(57) ABSTRACT

A stretcher device configured for use with an optical microscope includes a platform defining an opening configured to receive hydrogel containing a biological sample. An indenting cylinder is axially aligned with the opening. At least one actuator is connected to the platform for moving the platform relative to the indenting cylinder such that the indenting cylinder stretches the hydrogel and thereby stretches the biological sample.

20 Claims, 23 Drawing Sheets

Figure 7A:
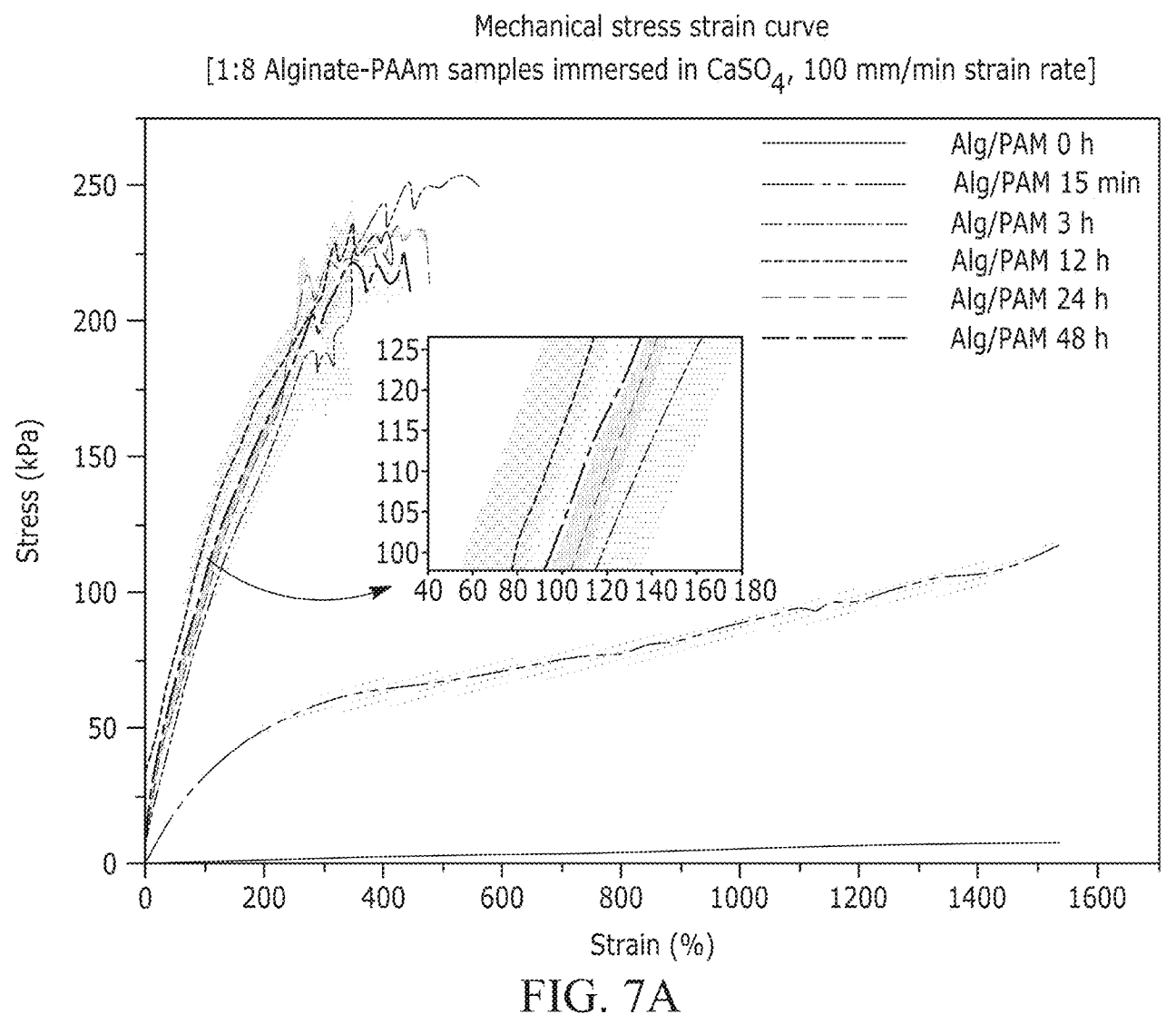

Mechanical stress strain curve

[1:8 Alginate-PAAm samples immersed in $CaSO_4$, 100 mm/min strain rate]

Alg/PAM 0 h
Alg/PAM 15 min
Alg/PAM 3 h
Alg/PAM 12 h
Alg/PAM 24 h
Alg/PAM 48 h

Stress (kPa)

0 50 100 150 200 250

Strain (%)

APPARATUS AND METHOD FOR EXPANSION MICROSCOPY

RELATED APPLICATIONS

This application claims the benefit of U.S. Provisional Application No. 63/495,118, filed Apr. 10, 2023, the entirety of which is incorporated by reference herein.

TECHNICAL FIELD

The present invention relates generally to microscopy, and specifically to a device for performing expansion microscopy on a biological sample.

BACKGROUND

The organization of biological and material samples are often at length scales smaller than the diffraction limit of light (~250 nm). Therefore, "super-resolution" imaging technologies have been developed to overcome this limitation and reach ~10's or even ~1's of nanometers in length scales. One super-resolution imaging method is expansion microscopy, which uses immobilizing samples on a swellable hydrogel and placing the sample in water to use osmotic force to separate and de-crowd features in the sample larger than the diffraction limit. By knowing the amount of expansion, the true location can be back calculated and the nanoscale image produced. This imaging can take place on conventional microscopes without expensive hardware.

Drawbacks of expansion microscopy using osmotic force include typically only ~4× expansion can be achieved without the need of multiple, iterative steps, thereby limiting the length scales that can be imaged. The process is also slow, with typical procedures taking days. Moreover, chemical fixatives and digestives required to anchor the sample to the hydrogel and enable expansion can damage the sample itself, which risks losing information from the sample. Finally, dynamic imaging of the sample over time is impossible since only a static image at a single timepoint is being produced.

SUMMARY

In one example, a stretcher device configured for use with an optical microscope includes a platform defining an opening configured to receive hydrogel containing a biological sample. An indenting cylinder is axially aligned with the opening. At least one actuator is connected to the platform for moving the platform relative to the indenting cylinder such that the indenting cylinder stretches the hydrogel and thereby stretches the biological sample.

In another aspect, the at least one actuator includes a linear actuator that translates the platform axially relative to the indenting cylinder.

In another aspect, the at least one actuator includes a motor that cooperates with a threaded rod to translate the platform axially relative to the indenting cylinder.

In another aspect, the at least one actuator includes a pair of motors that cooperate with a pair of threaded rods to translate the platform axially relative to the indenting cylinder.

In another aspect, the at least one actuator moves the platform such that the hydrogel is biaxially stretched.

In another aspect, the at least one actuator moves the platform such that the hydrogel is equibiaxially stretched.

In another aspect, the hydrogel is stretchable and cytocompatible.

In another aspect, an objective of the microscope is focused on the hydrogel at an end of the indenting cylinder.

In another aspect, the hydrogel has a Young's Modulus about 1 kPa to about 150 kPa and an elongation (% strain) at fracture of at least about 400%.

In another aspect, the hydrogel is ionically and covalently crosslinked.

In another aspect, the hydrogel includes an ionically crosslinked alginate and a covalently crosslinked polyacrylamide.

In another aspect, the biological sample includes a plurality of cells cultured in the hydrogel and which are visualized by the optical microscope upon expansion of the hydrogel.

In another example, a method of visualizing a biological sample includes providing the biological sample in a hydrogel and positioning the hydrogel on a stretcher device configured to be mounted on an optical microscope. The hydrogel is biaxially stretched with the stretcher device to thereby stretch the biological sample. The stretched biological sample is visualized with the optical microscope.

Other objects and advantages and a fuller understanding of the invention will be had from the following detailed description and the accompanying drawings.

BRIEF DESCRIPTION OF THE DRAWINGS

FIG. 7A is a graph depicting stress versus strain properties for various crosslinked hydrogels.

DETAILED DESCRIPTION

The present invention relates generally to microscopy, and specifically to a device for performing expansion microscopy on a biological sample. More specifically a stretcher device is configured for use with an optical microscope and includes a platform defining an opening configured to receive hydrogel containing a biological sample. An indenting cylinder is axially aligned with the opening. At least one actuator is connected to the platform for moving the platform relative to the indenting cylinder such that the indenting cylinder stretches the hydrogel and thereby stretches the biological sample. Images taken of the expanding hydrogel can be used to evaluate the biological sample.

Figure 1:
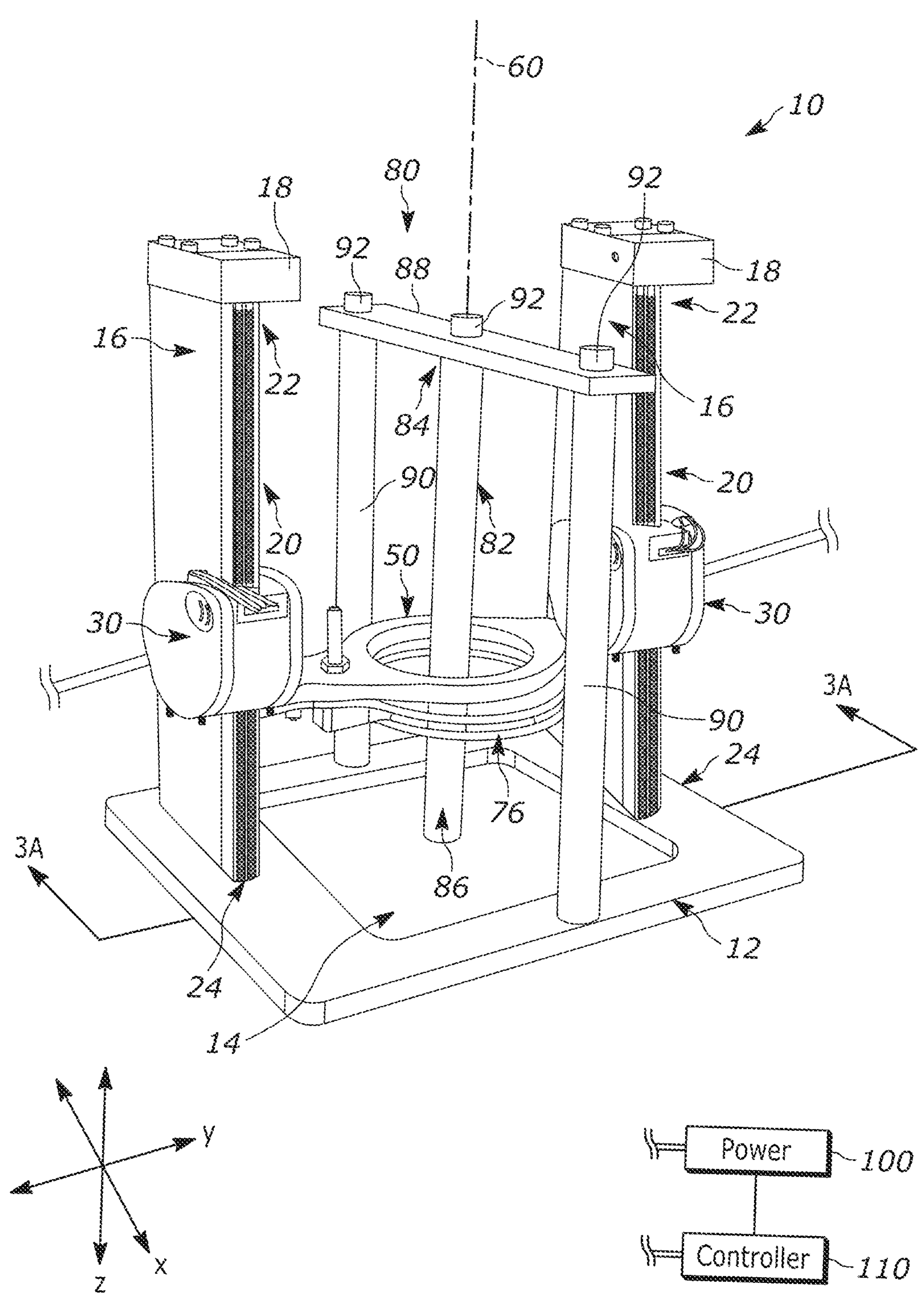
FIG. 1 is a schematic illustration of an example device for performing expansion microscopy of a biological sample in accordance with an aspect of the present invention.
Figure 2A:
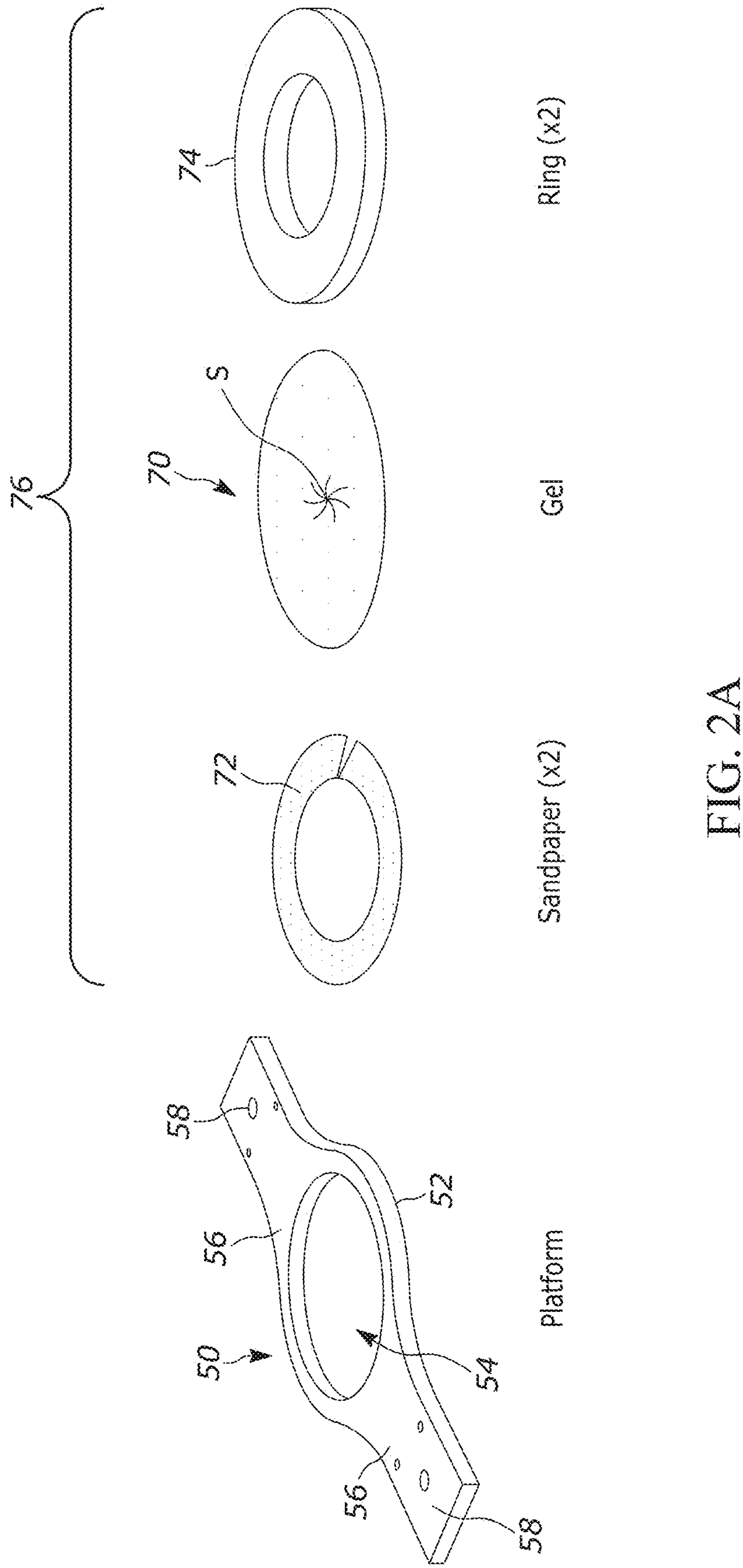
FIG. 2A is a schematic illustration of an exploded view of a subassembly of the device of FIG. 1.
Figure 2B:
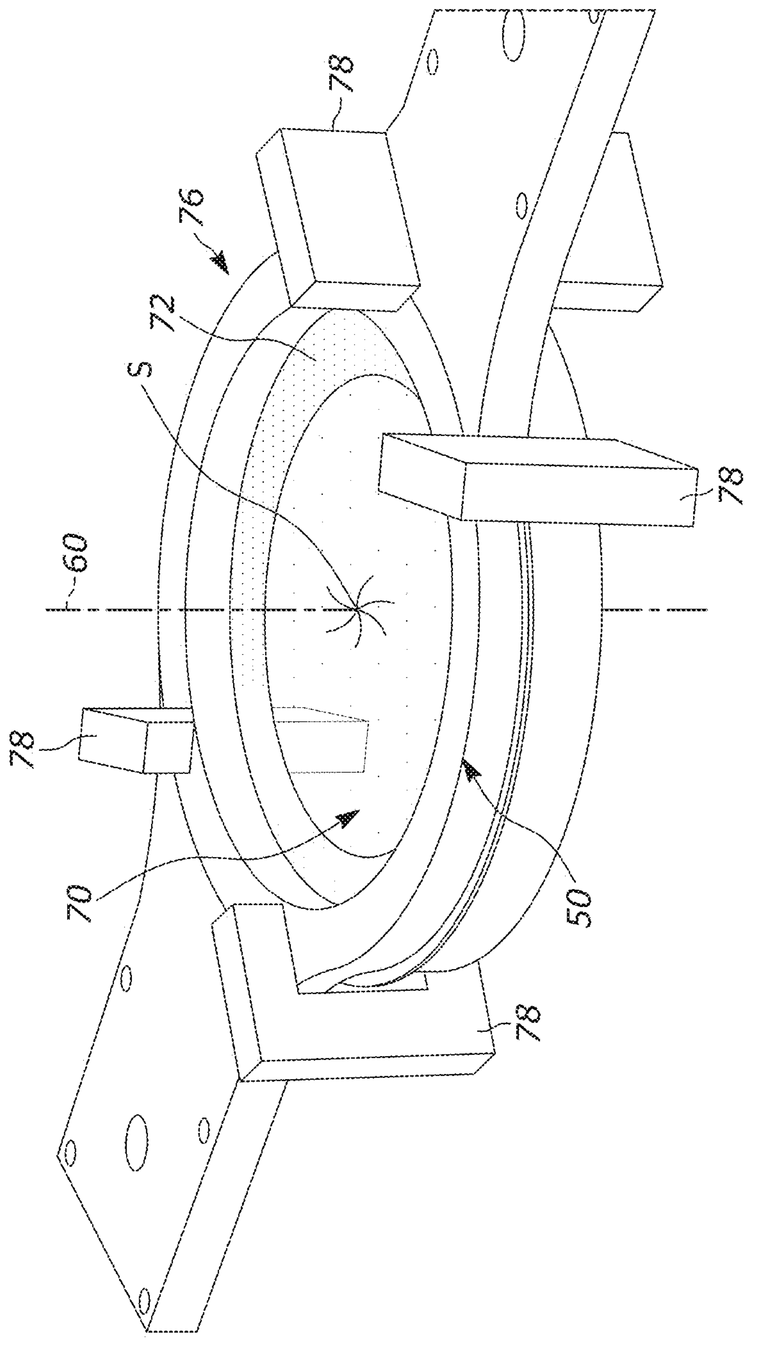
FIG. 2B is a schematic illustration of the subassembly when assembled.

FIGS. 1-2B illustrate an expansion microscopy device 10 in accordance with an aspect of the invention. Turning to FIG. 1, the device 10 includes a base 12 defining a central opening 14. A pair of support arms 16 extend vertically from the base 12 and parallel to one another. The support arms 16 are located on opposite sides of the opening 14. An end cap 18 is secured to the end of each support arm 16. Each of the base 12, support arms 16, and end caps 18 is formed from a durable material, such as metal or plastic. The components 12, 16, 18 can be 3D printed.

A pair of threaded rods 20 each extends from a first end 24 secured to the base 12 to a second end 22 secured to one of the end caps 18. The threaded rods 20 extend parallel to one another and are fixed to prevent rotation thereof. A motor or actuator 30 is secured to each threaded rod 20. Each motor 30 has a first, unactuated condition fixed in position along the length of the respective threaded rod 20 and a second, actuated condition in which the motor translates along the length of the respective threaded rod. The direction of rotation of the motor 30 dictates the direction of its travel along the threaded rod 20.

A platform 50 is secured to the pair of motors 30. The platform 50 is made of a rigid material, e.g., metal or plastic, and includes a base 52 defining an opening 54 (FIG. 2A). In one example, the opening 54 is round, e.g., circular. Arms 56 extend outward in opposite directions from the base 52. Each arm 56 terminates at a portion 58 configured to mount the arm to the motor 30. This can include, for example, openings for fasteners, recesses for clamps, and the like.

A subassembly 76 is formed for connection to the platform 50 (FIGS. 2A-2B). The subassembly 76 includes a hydrogel 70, a pair of abrasive materials 72 provided on opposite sides of the hydrogel, and a pair of rings 74 arranged on opposite sides of the abrasive materials, thereby forming the exterior of the subassembly. The abrasive materials 72 can be, for example, sandpaper or the like.

The hydrogel 70 is in the form of a disc or disc-shaped, optically transparent such that light can pass through the hydrogel, stretchable, cytocompatible (i.e., substantially non-cytotoxic), and optionally biocompatible with biological cell culture. The hydrogel 70 can be symmetrically biaxially (e.g., equibiaxially) or asymmetrically biaxially stretched or expanded up to about 20 times without fracture. For example, the hydrogel 70 can be equibiaxially stretchable or expandable about 2 times, about 3 times, about 4 times, about 5 times, about 6 times, about 7 times, about 8 times, about 9 times, about 10 times, about 11 times, about 12 times, about 13 times, about 14 times, about 15 times, about 16 times, about 17 times, about 18 times, about 19 times, or about 20 times without fracture.

The hydrogel 70 can have a Young's Modulus of about 1 kPa to about 150 kPa. For example, the hydrogel 70 can have a Young's Modulus of about 1 kPa to about 140 kPa, about 1 kPa to about 130 kPa, about 1 kPa to about 120 kPa, about 1 kPa to about 110 kPa, about 1 kPa to about 100 kPa, about 1 kPa to about 90 kPa, about 1 kPa to about 80 kPa, about 1 kPa to about 70 kPa, about 1 kPa to about 60 kPa, about 1 kPa to about 50 kPa, about 1 kPa to about 40 kPa, about 1 kPa to about 30 kPa, or about 1 kPa to about 20 kPa. In some embodiments, the hydrogel can have a Young's Modulus less about 55 kPa.

The hydrogel 70 can also have an elongation (% strain) at fracture of at least about 400%. For example, the hydrogel 70 can have an elongation (% strain) at fracture of about 400% to about 2000%, about 500% to about 2000%, about 500% to about 2000%, about 700% to about 2000%, about 800% to about 2000%, about 900% to about 2000%, or about 1000% to about 2000%, and ideally the highest strain at fracture for that particular material.

In some embodiments, the hydrogel can be formed from one or more crosslinkable hydrophilic monomers. The one or more hydrophilic monomers can include polymerizable materials, monomers or polymers. Any hydrophilic monomer may be used without limitations. In certain embodiments, the hydrophilic monomer may be an anionic monomer or a salt thereof, a non-ionic hydrophilic monomer, an amino group-containing unsaturated monomer and a quaternary salt thereof, or a combination thereof. Non-limiting examples of hydrophilic monomers include, but are not limited to, anionic monomers or salts thereof, such as acrylic acid, methacrylic acid, anhydrous maleic acid, fumaric acid, crotonic acid, itaconic acid, 2-acryloylethanesulfonic acid, 2-methacryloylethanesulfonic acid, 2-(meth)acryloylpropanesulfonic acid, and 2-(meth)acrylamide-2-methylpropane sulfonic acid; non-ionic hydrophilic monomers, such as (meth)acrylamide, N-substituted (meth)acrylate, 2-hydroxyethyl (meth)acrylate, 2-hydroxypropyl (meth)acrylate, methoxypolyethyleneglycol (meth)acrylate, and polyethylene glycol (meth)acrylate; and amino group containing unsaturated monomers or quaternary salts thereof, such as (N,N)-dimethylaminoethyl (meth)acrylate, and (N,N)-dimethylaminopropyl (meth)acrylamide, with preference for an acrylic acid or a salt thereof. Additionally and/or alternatively, polymerizable materials can include, but are not limited to, water soluble groups containing a polymerizable group, substituted or unsubstituted methacrylates, acrylates, acrylamides, bisacrylamides, methacrylamides, vinylalcohols, vinyl amines, allylamines, allylalcohols, including divinylic crosslinkers thereof (e.g., N,N-alkylene bisacrylamides).

In one instance, the hydrogel 70 can be formed from first hydrophilic monomers crosslinked with a first agent and second hydrophilic monomers crosslinked with a second agent different than the first agent. In some embodiments, the first hydrophilic monomers can be ionically crosslinked to form an ionically crosslinked network and the second hydrophilic monomers can be covalently crosslinked to form an interpenetrating covalently crosslinked polymer network.

In some embodiments, the ionically crosslinked first polymer network can include alginates that are ionically crosslinked. Natural source alginates, for example, from seaweed or bacteria, are useful and can be selected to provide side chains with appropriate M (mannuronate) and G (guluronate) units for the ultimate use of the polymer. Isolation of alginate chains from natural sources can be conducted by conventional methods. See Biomaterials: Novel Materials from Biological Sources, ed. Byrum, Alginates chapter (ed. Sutherland), p. 309-331 (1991). Alternatively, synthetic alginates having a selected M and G unit proportion and distribution prepared by synthetic routes, such as those analogous to methods known in the art, can be used.

Gluronic acids of different alginate monomers can form ionic crosslinks with $Ca^{2+}$ provided by an aqueous solution of $CaCl_2$ resulting in an ionically crosslinked network. The extent of crosslinking can be controlled by the concentration of $CaCl_2$. The higher concentration can correspond to a higher extent of crosslinking. The extent of crosslinking alters the mechanical properties of the hydrogel and can be controlled as desired for the particular application. In general, a higher degree of crosslinking results in a stiffer gel. It will be appreciated that the crosslinker helps to make the hydrogel 70 easier to handle by reducing tackiness while helping with hydrogel 70 energy dissipation and toughness to help prevent fracture when defects are present.

In some embodiments, the covalently crosslinked second polymer network can include a polyacrylamide that is covalently crosslinked. Polyacrylamides are formed by copolymerization of acrylamide and bis-acrylamide, such as N,N'-methylenebisacrylamide (MBAA). The reaction is a vinyl additional polymerization initiated by a free-radical generating system. Polymerization can be initiated by ammonium persulfate (APS), and tetramethylethylenediamine (TEMED). TEMED accelerates the rate of formation of free radicals from persulfate and these in turn catalyze polymerization. The persulfate free radicals convert acrylamide monomers to free radicals that react with unactivated monomers to begin the polymerization reaction. The elongated polymer chains are randomly crosslinked by MBAA, resulting in a gel which depends on polymerization conditions and monomer concentrations.

A biological sample S can be provided or embedded in the hydrogel by, for example, mixing the biological sample with the hydrophilic monomers prior to polymerization and polymerizing and crosslinking the monomers with the biological sample. In certain embodiments, a cell sample can be permeated with one or more monomers or a solution comprising one or more monomers or precursors which are then reacted to form the hydrogel 70. For example, the sample can be permeated with an alginate and acrylamide or a solution comprising the alginate and acrylamide (e.g., a solution comprising alginate, acrylamide, and bis-acrylamide). Once the sample is permeated, the solution can be initiated to form a polyacrylamide. For example, tetramethylethylenediamine (TEMED) and ammonium persulfate (APS) can be used to initiate and/or catalyze the polymerization of acrylamide. The alginate can then be ionically crosslinked by soaking the hydrogel in an ionic crosslinking solution, such as $Ca^{2+}$ provided by an aqueous solution of $CaCl_2$.

The biological sample S provided in the hydrogel 70 can include any biological or biochemical sample, such as a cell, array of cells, tumor, tissue, cell isolate, biochemical assembly, or a distribution of molecules suitable of microscopic analysis. For example, a biological sample can include a cell or a population of cells (for example, an isolated cell or plurality of cells excised from a tissue or grown in vitro by tissue culture techniques, a population of cells may also be a plurality of cells isolated from an animal or human), cells or tissue from a biopsy, a tumor, tissue (e.g., brain, heart, lung, liver, kidney, spleen, bladder, stomach, colon, bones, muscle, skin, ligaments, glands, lymph nodes, genitals, breasts, pancreas, prostate, thyroid, spinal cord, and eyes), a cell isolate, or a distribution of molecules suitable for microscopic analysis.

In some embodiments, the biological sample S can include cells cultured in the hydrogel 70. In any case, the hydrogel 70 material is selected so as to be biocompatible with cell culture. It will be appreciated that the appropriate Young's Modulus for the hydrogel can vary depending on the cell cultured. For example, the Young's Modulus should be about 1 kPa for brain cells and on the order of MPa or greater for ligaments, bones, etc. The ability of the cell cultured to dissipate during hydrogel 70 expansion and the toughness of the hydrogel help drive material selection.

Although not shown, it will be appreciated that the biological sample S can be tagged, marked, or otherwise labeled to assist in microscopic imaging during hydrogel 70 expansion. This can include, but is not limited to, adding a detectable label to the sample S.

The detectable label can include labels useful in localizing to a target (e.g., proteins, lipids, steroids, nucleic acids, extracellular matrix, and sub-cellular structures) in a cell or tissue sample and providing a detectable signal. In an embodiment, the target can be diagnostic. In another embodiment, the target can be prognostic. In certain embodiments, the target can be predictive of responsiveness to a therapy. In some embodiments, the target can be candidate agents in a screen (e.g., a screen for agents that will aid in the diagnosis and/or prognosis of disease, in the treatment of a disease).

In certain embodiments, the detectable label provides an optically detectable signal. The detectable label would be dependent on/influenced by the particular imaging technology employed. To this end, fluorescent microscopy could be provided with fluorophore/dye labels, while imaging mass spectroscopy would instead use isotope labeling.

The detectable label can be bound to the target (e.g., proteins, lipids, steroids, nucleic acids, extracellular matrix, and sub-cellular structures) in the biological sample with a binding moiety. The binding moiety refers to any molecule that specifically binds to the target of interest in the biological sample. The binding moiety may be any molecule known in the art and will depend on the target. Interaction of the binding moiety with the target is achieved through some degree of specificity and/or affinity for the target. Both specificity and affinity are generally desirable. Binding moieties can include, but are not limited to, oligonucleotides (including nucleic acid probes), proteins, ligands, lectins, antibodies, aptamers, bacteriophages, host defense peptides (e.g., defensins), bacteriocins (e.g., pyocins), and receptors. In certain embodiments, the binding moiety can be an antibody, a nanobody, a protein, a polypeptide, a nucleic acid, or a small molecule.

In some embodiments, the detectable label and binding moieties can include, for example, a fluorescently labelled antibody, nanobody, protein, peptide, nucleic acid, or small molecule. For example, a detectable label and binding moiety, can be a fluorophore covalently linked any binding moiety (as in, for example, an antibody covalently linked to fluorescein). In another embodiment, the detectable label is a fluorophore and the fluorophore is a bis-benzimide, a boron dipyrromethene, a carbopyronine, a coumarin, a cyanine, a fluorescein, a merocyanine, an oxazine, a pyrene, a rhodamine, a polymer dot, a semiconductor quantum dot, or any combination thereof. In certain embodiments, the fluorophores include, but are not limited to, bis-benzimides (e.g., Hoechst 33342), coumarins, pyrene (e.g., Alexa Fluor 405), fluorescein, rhodamine (e.g., Alexa Fluor 488, Atto 488, TAMRA, Atto 565, Alexa Fluor 568, Texas Red, silicon rhodamine (SiR)), oxazine, carbopyronine (e.g., Atto 647N), semiconductor quantum dot, or polymer dot fluorophores.

In certain embodiments, the detectable label or detectable label binding moiety comprises a protein or peptide. Such proteins or peptides can be expressed in the cell or tissue sample. In certain embodiments, the protein is a fluorescent protein. In some embodiments, such fluorescent proteins can include, but are not limited to, a green fluorescent protein (GFP), a yellow fluorescent protein (YFP), an orange fluorescent protein (OFP), a cyan fluorescent protein (CFP), a blue fluorescent protein (BFP), a red fluorescent protein (RFP), a far-red fluorescent protein, or a near-infrared fluorescent protein, DsRed, mCherry, and UnaG. In a non-limiting example, a cell sample can express a target protein that is expressed in-frame with a fluorescent protein or peptide (e.g., a GFP protein). A cell or tissue sample comprising such a GFP-tagged target protein can be modified by the methods and kits disclosed herein for expansion microscopy without the use of a binding moiety (i.e., DNA or antibody).

In another embodiment, the biological sample S can be contacted with a dye. For example, it may be desirable to contact the cells and intracellular structures of the tissue sample with one or more macromolecules. For example, macromolecules may be provided that promote the visualization of particular cellular target biomolecules (e.g., proteins, lipids, steroids, nucleic acids, extracellular matrix, and sub-cellular structures). In a non-limiting example, the cell or tissue sample may be contacted with nucleic acid stains like TO-PRO3, DAPI, or Hoechst, thus labeling the nuclei of cells.

The biological sample S can further be functionalized with a tethering group that can link the sample to a polymer or monomer of hydrogel during expansion or stretching of the hydrogel 70. The tethering group can include, for example, homo- or hetero-bifunctional reagents with identical or non-identical reactive groups, respectively, permitting the establishment of inter- as well as intra-molecular crosslinkages. Bifunctional reagents, specifically reacting with primary amine groups (i.e., ε-amino groups of lysine residues) can form stable inter- and intra-subunit covalent bonds. Bifunctional imidoesters can have varying lengths of the spacer arm between their reactive end groups (e.g., dimethyl adipimidate (DMA), dimethyl suberimidate (DMS) and dimethyl pimelimidate (DMP); with spacer arms of 8.6 Å, 11 Å and 9.2 Å, respectively). Some bifunctional reagents can form stable thioester bonds between two interacting proteins. For instance, a linking agent with one amine-reactive end and a sulfhydryl-reactive moiety can be used in situations where the catalytic site of one of the protein contains an amine (e.g., bifunctional reagents with a NHS ester at one end and an SH-reactive groups (i.e., maleimides or pyridyl disulfides)).

Referring again to FIG. 2B, the components 70, 72, 74 are aligned with one another and stacked longitudinally atop one another. The subassembly 76 is aligned with the platform 50 such that the rings 74 are aligned with the opening 54 in the platform 50. In this configuration, the sample S is visible through the opening 54 and generally centered therein, and unobstructed by either the abrasive materials 72 or the rings 74. One or more clamping members 78 then fix the subassembly 76 to the platform 50 such that the components 70, 72, 74 and opening 54 are centered along a common centerline 60 that extends generally though the sample S.

Returning to FIG. 1, an indenting device 80 is also secured to the base 12. The indenting device 80 includes a vertically oriented cylinder 82 extending parallel to the threaded rods 20 from a first end 84 to a second end 86. The first end 84 is secured via fastener 92 to a mounting member 88 extending radially outward in both directions from the cylinder 82. Posts 90 are secured to the base 12 on opposite sides of the opening 14. The posts 90 extend to the mounting member 88 and are secured thereto via fasteners 92. Due to this arrangement, the cylinder 82 is aligned with the center of the opening 14. The second end 86 of the cylinder 82 is vertically spaced from the opening 14 in the base 12.

Figure 3A:
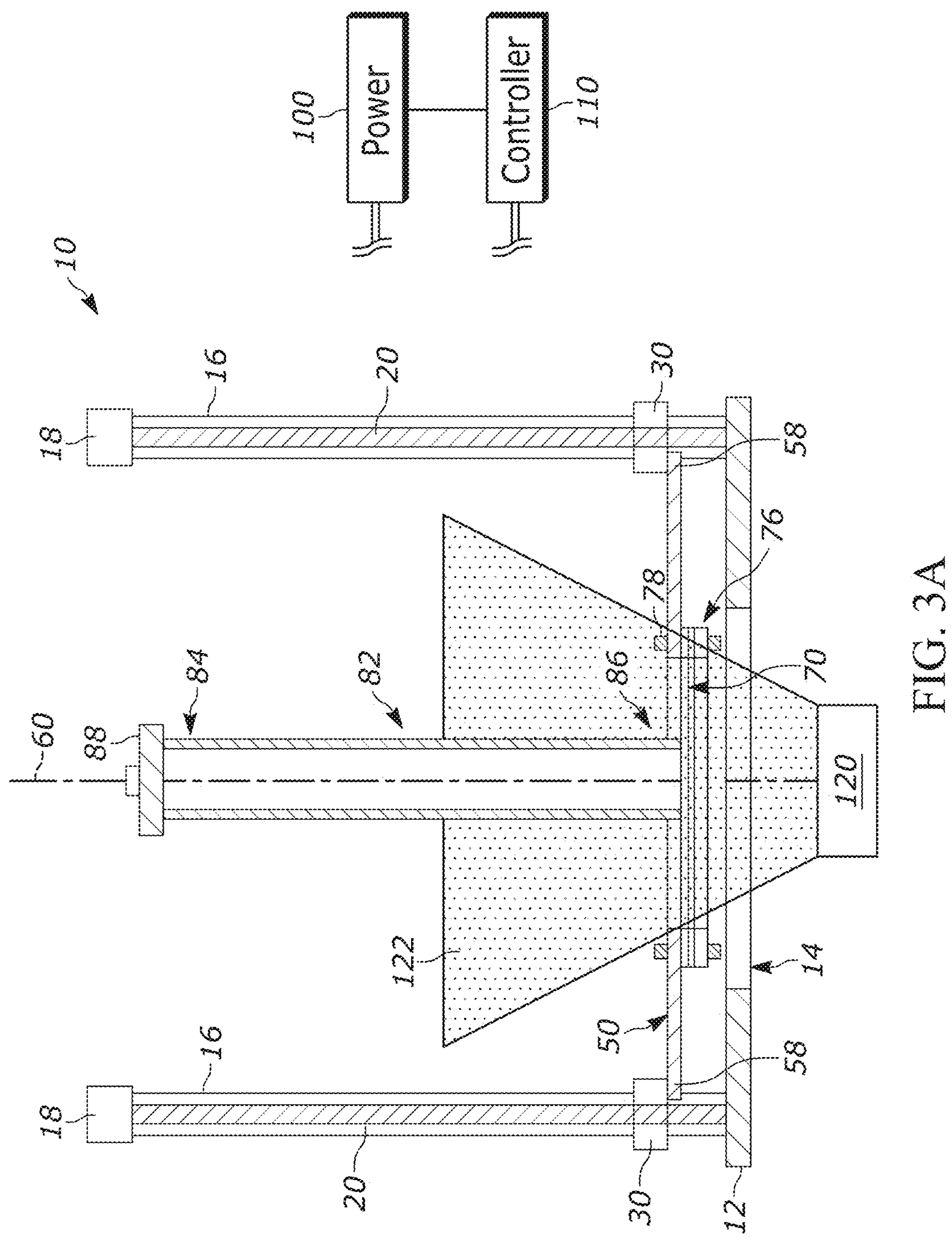
FIG. 3A is a schematic illustration of the device in a first condition in which the biological sample is un-stretched.

Turning to FIG. 3A, the portions 58 of the arms 56 on the platform 50—with the subassembly 76 secured thereto—are secured to the motors 30. This aligns the centerline 60 with both the center of the cylinder 82 and the center of the opening 14 in the base 12. The motors 30 are connected both to a power supply 100 and a controller 110 for actuating the motors. An optical microscope 120 configured to capture both static and video images is positioned under the device 10 with its field of view (shaded at 122) aimed upwards. The microscope 120 can be compatible with imaging methods such as, for example, optical microscopy (e.g., fluorescence, absorption, scattering, bright field, oblique illumination, dark field, phase contrast, differential interference contrast, interference reflection, epifluorescence, confocal microscopy), laser microscopy, electron microscopy, and scanning probe microscopy or other detection schemes, such as mass-to-charge ratio (MALDI-MS), topology (AFM, profilometry), electrochemical (SECM) or others. The field of view 122 is configured to extend over the entire footprint of the hydrogel 70 and away from the microscope 120.

To prepare the device 10 for expansion microscopy imaging, the motors 30 [if not performed already] are actuated by the controller 110 to move the platform 50 downwards towards the base 12 until the platform is below the plane of bottom of the cylinder 82. This allows the subassembly 72 to be secured to the platform 50 as previously described out of the way of the cylinder 82. This arranges the device 10 in a first condition or position illustrated in FIG. 3A in which the hydrogel 70 is aligned with and below (as shown) the end 86 of the cylinder 82. In one example, the motors 30 are actuated to raise the platform 50 until the cylinder 82 contacts but does not deflect the hydrogel 70 and then shut off to place the device 50 in the first condition.

Figure 3B:
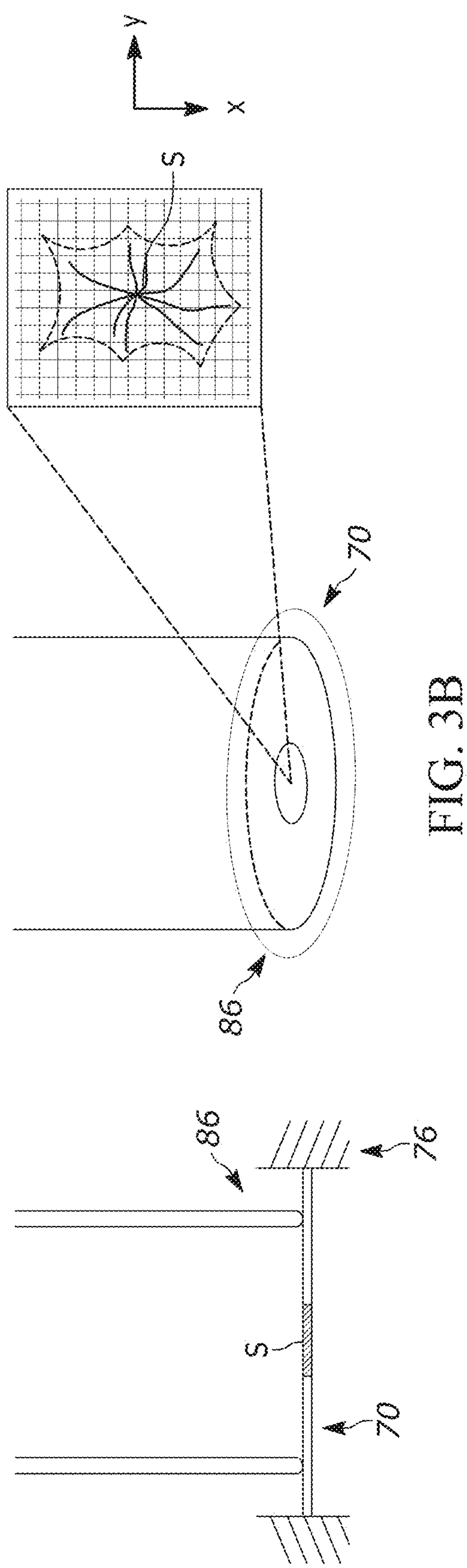
FIG. 3B is an enlarged view of a portion of FIG. 3A.

As shown in FIG. 3B, at this point the sample S is aligned with the center of the cylinder 82 while the axial extent of the end 86 encircles the sample. In other words, the perimeter of the cylinder 82 is spaced radially from the sample S. That said, the sample S generally occupies the dashed line footprint within the x-y plane. The field of view 122 of the microscope 120 covers the entire hydrogel 70 and thereby covers the entire sample S.

Figure 4A:
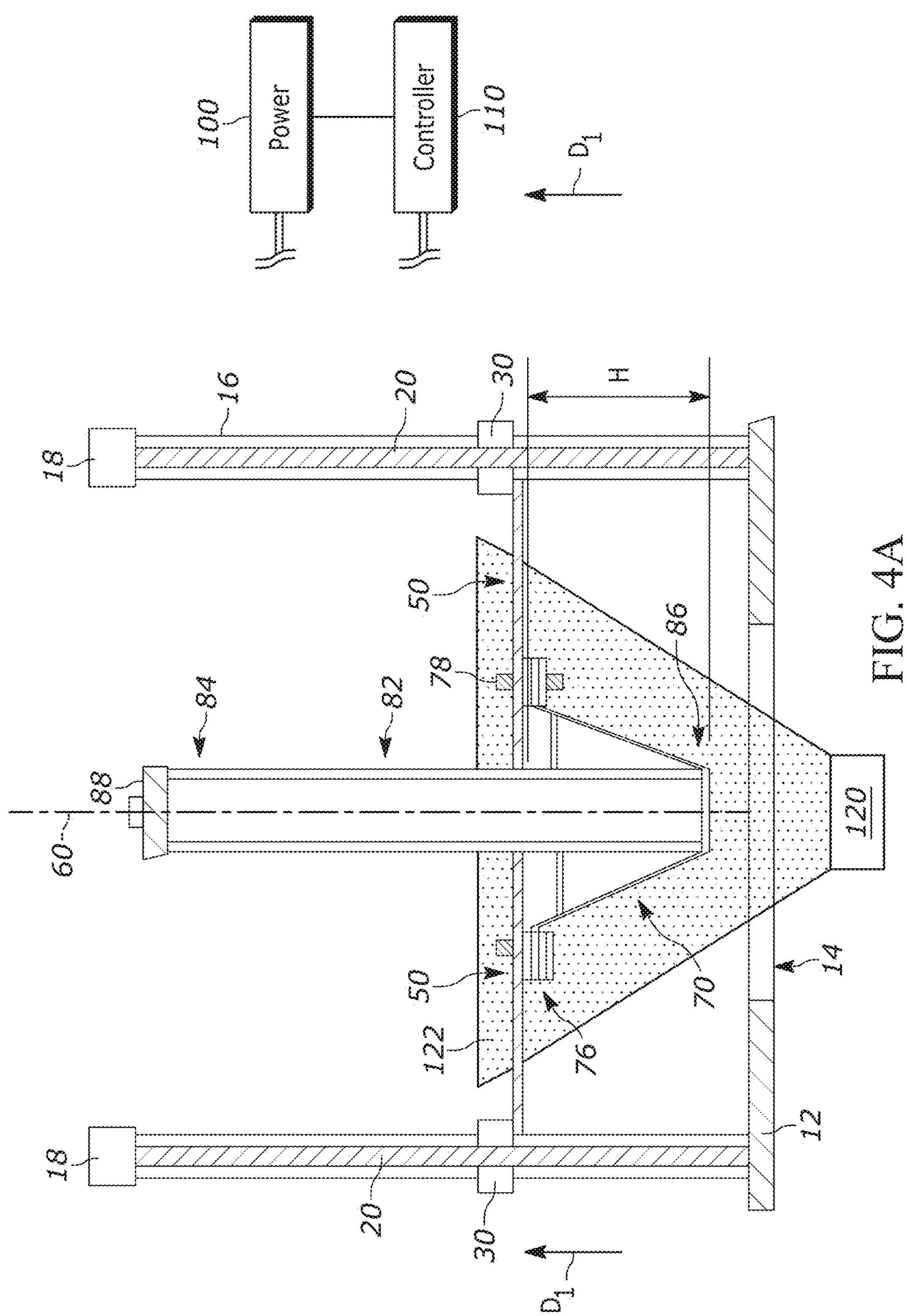
FIG. 4A is a schematic illustration of the device in a second condition in which the biological sample is stretched.
Figure 4B:
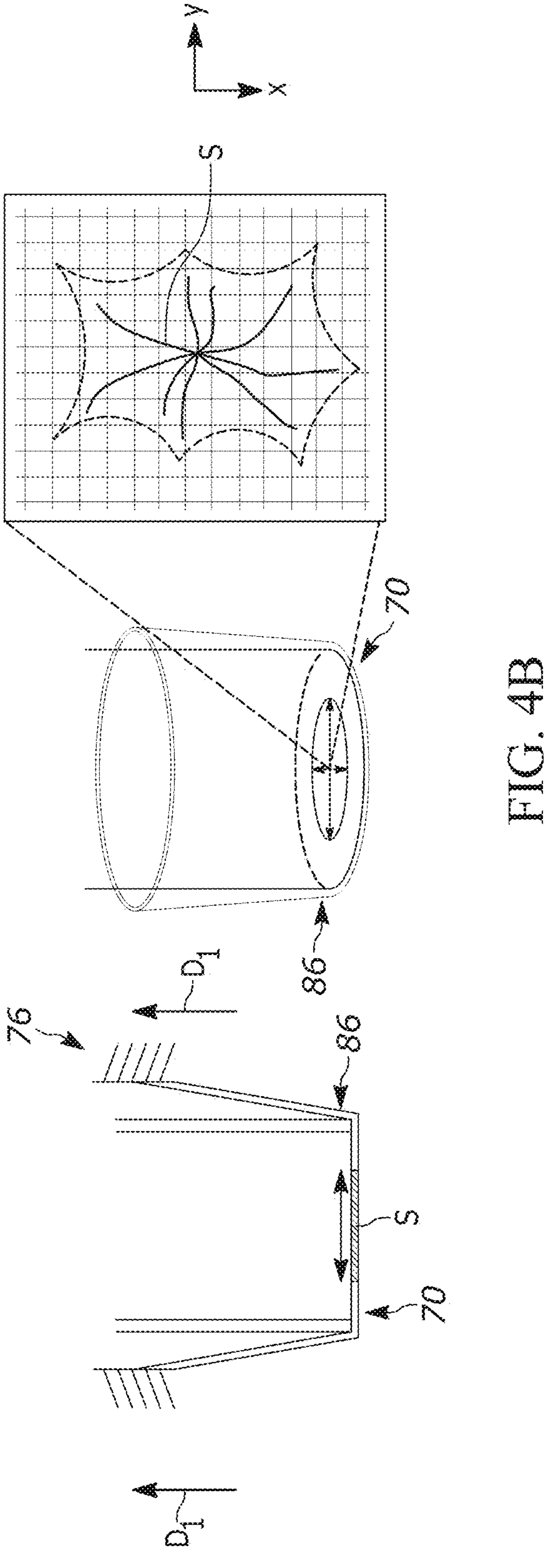
FIG. 4B is an enlarged view of a portion of FIG. 4A.

Turning to FIGS. 4A-4B, the motors 30 are actuated by the controller 110 and translate upwards along the threaded rods 20 in the direction $D_1$. Since platform 50 is fixed to the motors 30, this causes the hydrogel 70 to move in the direction $D_1$. The stationary cylinder 82 holds the central portion of the hydrogel 70 in place while the remainder thereof is pulled upwards by the moving platform 50. The motors 30 are actuated until the platform 50 reaches a predetermined height H above the initial position of FIG. 3A and coinciding with placing the device 10 in a second condition. This height H coincides with a predetermined or calculated amount of expansion of the hydrogel 70.

Since the cylinder 82 is centered on the hydrogel 70 and the platform 50 encircles the hydrogel, the hydrogel is stretched/expanded in both the x- and y-directions. More specifically, the moving platform 50 applies tensile stress to the center of the hydrogel 70 held by the cylinder 82, thereby increasing the tensile strain on the hydrogel. Eventually, the tensile strain reaches a point that elastic deformation/expansion of the hydrogel 70 occurs. The expansion can be symmetrically biaxial [equibiaxial] or asymmetrically biaxial. In this example, the expansion is equibiaxial. With this in mind, the height H coincides with a known, equibiaxial expansion of the hydrogel 70, such as about 20× equibiaxial expansion.

That said, the sample S likewise undergoes equibiaxial expansion so as to have the new footprint generally indicated at the dashed lines in FIG. 4B and within the x-y plane. The cylinder 82 is sized such that the footprint of the sample S before and after expansion of the hydrogel 70 is confined within the footprint of the end 86 of the cylinder 82. In other words, the expansion is tailored to prevent movement of the sample S out of the x-y plane and upwards along the exterior of the cylinder 82. To this end, the height H is selected to prevent such undesirable expansion.

The hydrogel 70 is specifically tailored to accommodate the biaxial expansion while retaining structural integrity. To this end, providing the hydrogel 70 with a weak ionic network (such as ionically crosslinked alginate), the crosslinks can unzip and reform. Providing the hydrogel 70 with a strong covalent network (such as covalently crosslinked PAAm) bridges cracks and stabilizes deformation. Both the alginate and PAAm networks both bear loads during biaxial expansion and, thus, as the hydrogel 70 is stretched, only ionic bonds are broken, which can reform and thereby heal internal damage.

During the transition of the device 10 from the first condition to the second condition, the controller 110 coordinates with the microscope 120 to take images within the field of view 122 of the expanding sample S. The images can be static images and/or continuous, video clips. The enables the device 10 to track expansion of the hydrogel 70 and, by extension, track expansion of the sample S the entire time the motors 30 translate along the threaded rods 20 in the manner $D_1$.

In certain embodiments, the expanded sample S can be imaged on any optical microscope, allowing effective imaging of features below the classical diffraction limit. Since the resultant specimen is preferably transparent, custom microscopes capable of large volume, wide field of view, 3D scanning may also be used in conjunction with the expanded sample S.

It will be appreciated that the platform 50 can be axially translated relative to the indenting cylinder 82 in other manners. For instance, one of the threaded rods 20 can be replaced with a smooth rod (not shown). In this configuration, a single motor 30 is provided on the threaded rod 20 while the platform 50 is connected to the smooth rod such that actuating the single motor 30 causes the platform (and thus the hydrogel 70) to translate along both the threaded and unthreaded rods.

Alternatively, the threaded rods 20 can both be replaced with smooth rods associated with or integral to one or more linear actuators (not shown). In this configuration, the linear actuator(s) are extended to effectively push the platform 50 upwards towards the end caps 18 and thereby stretch the hydrogel 70 on the indenting cylinder 82. In any of these alternative scenarios, the device 10 transitions from the first condition to the second condition to biaxially expand the sample S while the microscope 120 acquires images of the expansion in real-time.

Movement of the platform 50 can be continuous between the first and second positions or discrete. In one example, the motors 30 are actuated to move the platform 50 vertically 1 mm before pausing/stopping and then moving another 1 mm vertically in a sequential manner. The stop between vertical movements can be a few seconds or up to a few minutes, e.g., about 3 minutes.

Other aspects described herein relate to reagents and kits thereof for practicing one or more of the above-described methods with the device 10. Reagents and kits may include one or more of the following: hydrophilic monomers; reagents for polymerizing the hydrophilic monomers to form a hydrogel; a detectable label; (e.g., labeled and or unlabeled antibodies, nucleic acid probes, and oligonucleotides), buffers (e.g., buffer for fixing, washing, clearing, and/or staining samples), mounting medium, embedding molds, and dissection tools). The reagents and kits thereof may vary greatly.

In addition to the above components, the kits may further include instructions for practicing the subject methods. These instructions may be present in the subject kits in a variety of forms, one or more of which may be present in the kit. One form in which these instructions may be present is as printed information on a suitable medium or substrate (e.g., a piece or pieces of paper on which the information is printed, in the packaging of the kit, in a package insert). Yet another means would be a computer readable medium (e.g., diskette, CD, digital storage medium), on which the information has been recorded. Yet another means that may be present is a website address which may be used via the Internet to access the information at a removed site. Any convenient means may be present in the kits.

EXAMPLE

Stretcher Device

Figure 5A:
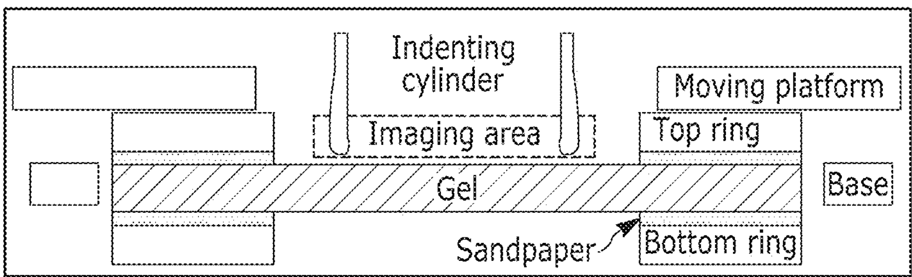
FIG. 5A is a schematic illustration of another example device.
Figure 5B:
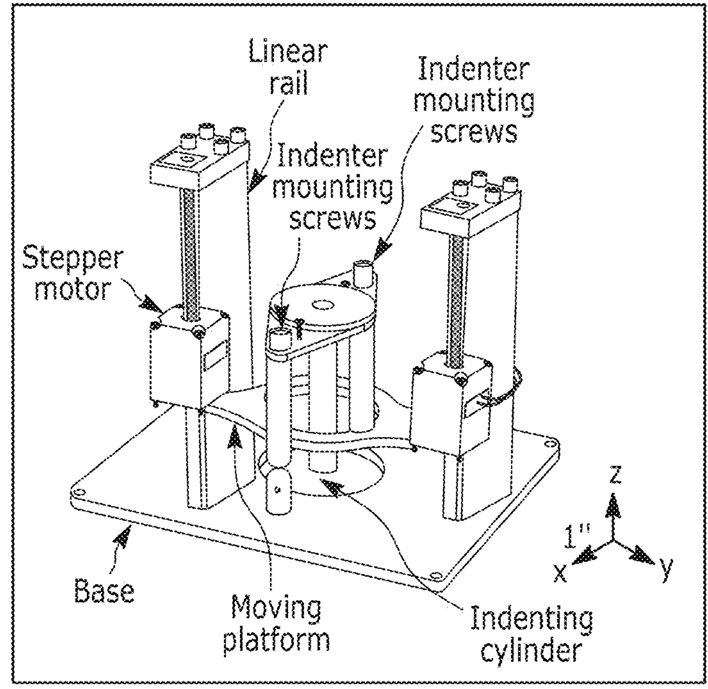
FIG. 5B is an isometric view of the device of FIG. 5A.
Figure 5C:
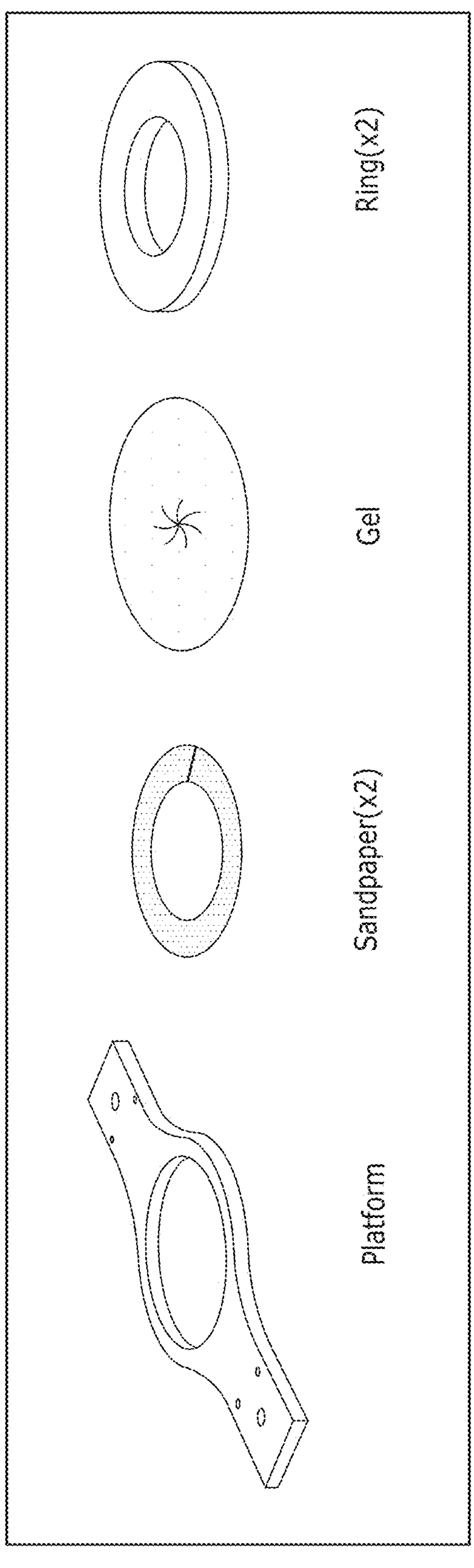
FIG. 5C is a schematic illustration of an exploded subassembly of the device of FIG. 5A.
Figures 5D, 5E:
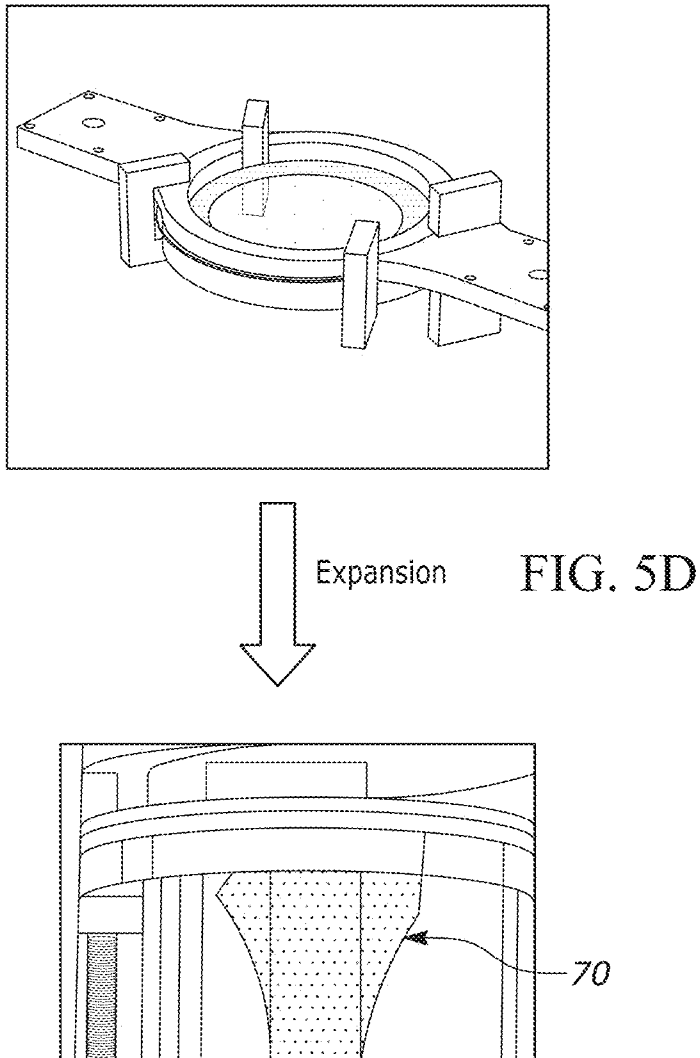
FIG. 5D is a schematic illustration of the subassembly of FIG. 5C in an assembled state.
FIG. 5E is a schematic illustration of the device of FIG. 5A during operation.
Figure 6A:
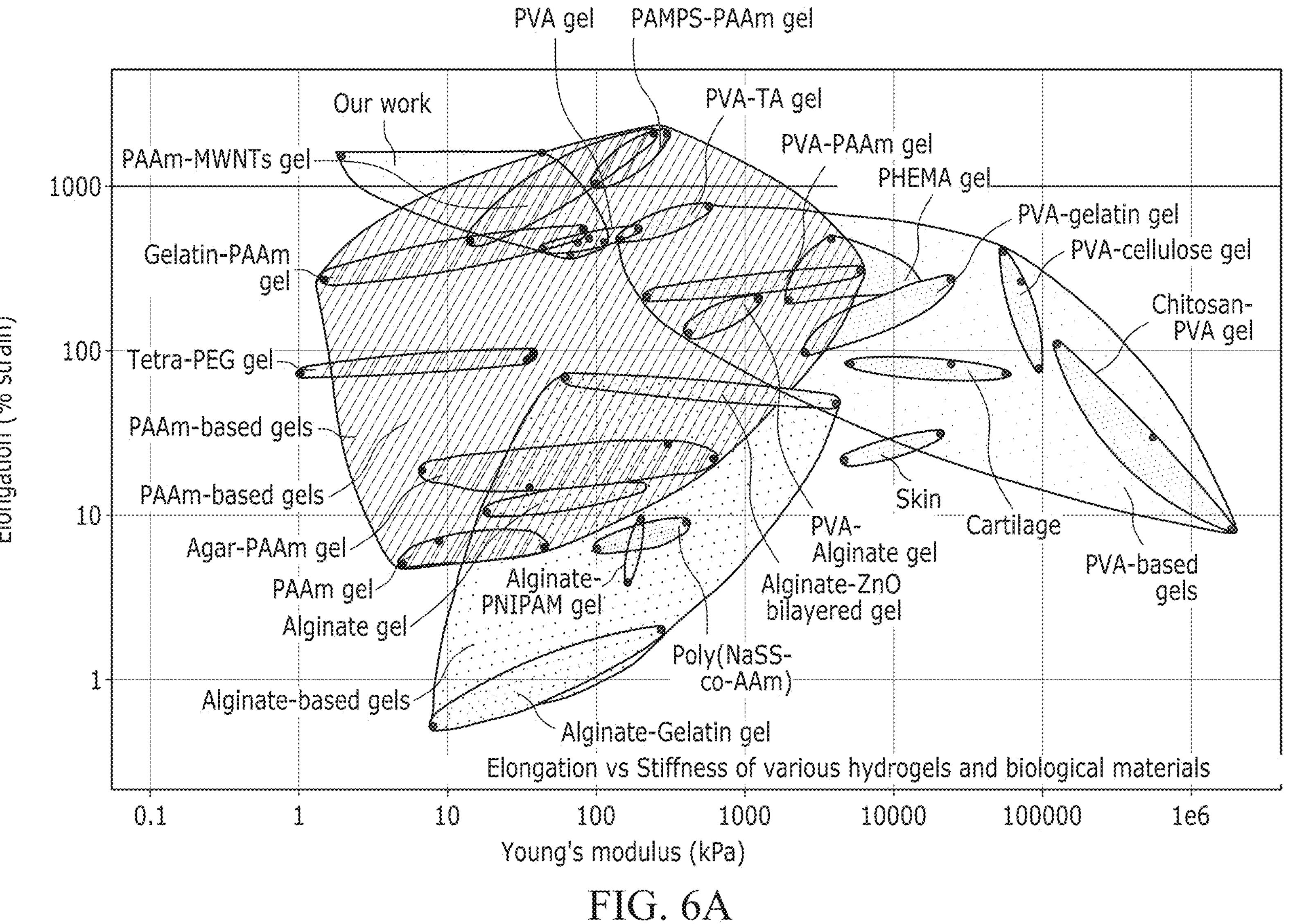
FIG. 6A is a graph depicting the material properties of various hydrogels under consideration.
Figure 6B:
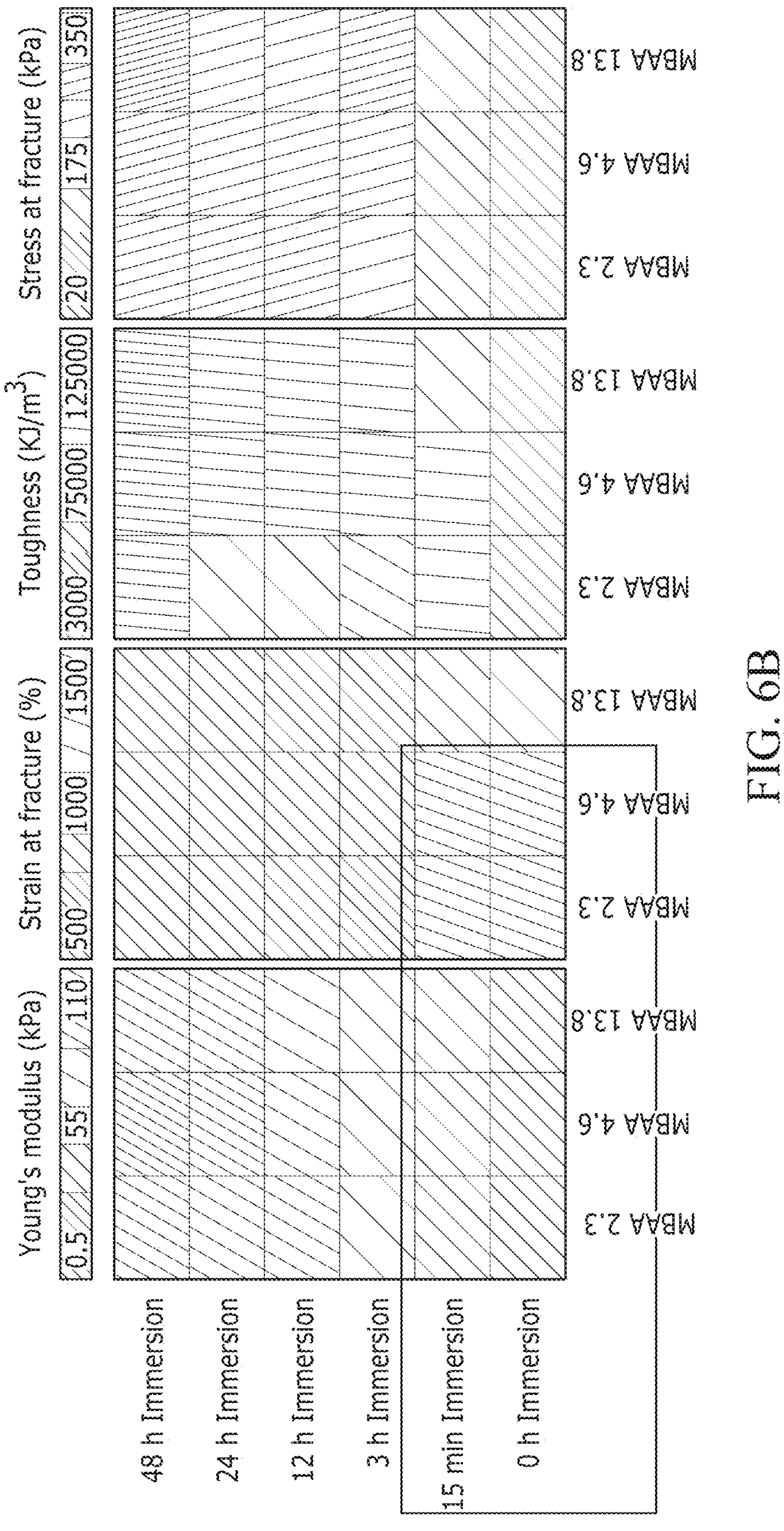
FIG. 6B is a graph depicting the material properties of various hydrogels under different crosslinker immersion times.

In this example, shown in FIGS. 5A-5D, a device 10 was constructed and included a platform 50 holding a hydrogel 70 below the indenting cylinder 82. The subassembly 76 included the platform 50, a pair of sandpaper rings as the abrasive material 72, the hydrogel 70 having the sample S, and two rings 74. Four clamping members 78 held the subassembly 76 together (FIG. 5D) as it was aligned with the cylinder 82 as previously described (FIG. 5A). The motors 30 were actuated to raise the platform 50 up the threaded rods 20 in the manner $D_1$ and thereby cause the cylinder 82 to equibiaxially stretch the hydrogel 70 and, thus, equibiaxially stretch the sample S therein (FIG. 5E).

Material Selection

FIGS. 6A-9B illustrate the methodology for selecting the specific hydrogel for this example. To this end, a range of known hydrogel compositions were plotted based on their elongation (% strain) and Young's Modulus (kPa) (FIG.

6A). A range of hydrogels was selected based on their desirable properties specific to this application, e.g., high levels of strength, an appropriately low stiffness, high stretchability, and efficient energy dissipation to help protect against crack propagation and/or preemptive tearing. Alginate and PAAm were generally selected for forming the respective ionic and covalent polymer networks based on these characteristics.

A mechanical properties chart (FIG. 6B) was generated for three available MBAA crosslinker compositions-MBAA 2.3, MBAA 4.6, and MBAA 13.8. The 2.3, 4.6, and 13.8 suffix associated with each MBAA composition indicated the final weight (mg) of the MBAA in the Alginate/PAAm hydrogel, which had a total volume of 50 mL. The three MBAA compositions were also varied by immersion time (0 to 48 hours) in a solution of $CaSO_4$. The highlighted rectangle covers the range of MBAA compositions desirable for this application.

Figure 7B:
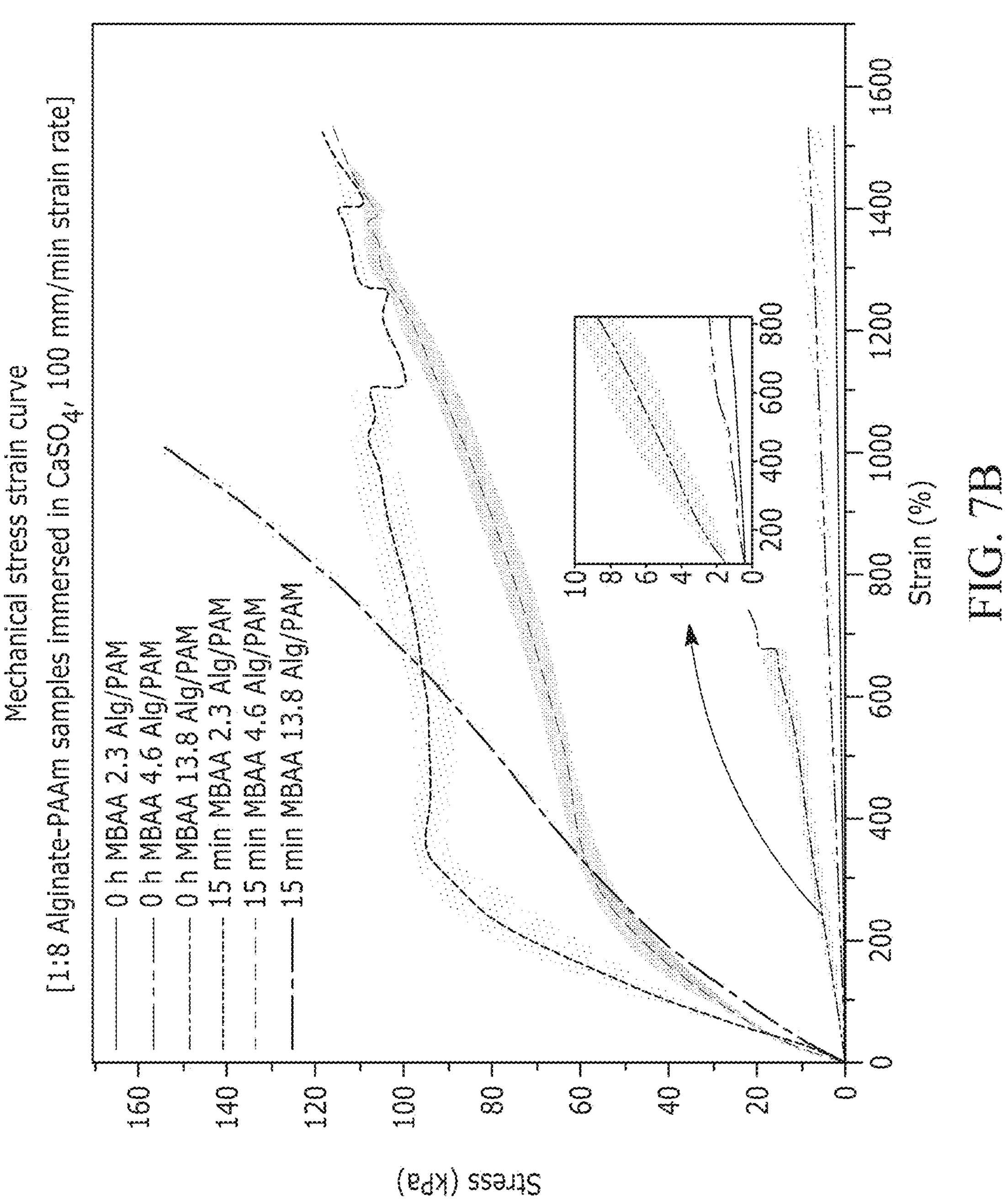
FIG. 7B is a graph depicting hydrogel properties based on varying immersion times in $CaSO_4$.

Bulk mechanical properties (stress vs. strain) for 1:8 weight ratio Alginate/PAAm samples having different $CaSO_4$ immersion times were plotted against one another (see FIGS. 7A and 7B). The elongation at break was reduced as a product of surface inhomogeneities leading to the preemptive fracture of the highly cross-linked network structures. Regarding the covalent crosslinking, the elongation at fracture point was dependent on hydrogel inhomogeneities. The $Ca^{2+}$-crosslinked gels provided adequate stiffness for 3D cell differentiation applications, but are less expandable.

Figure 8:
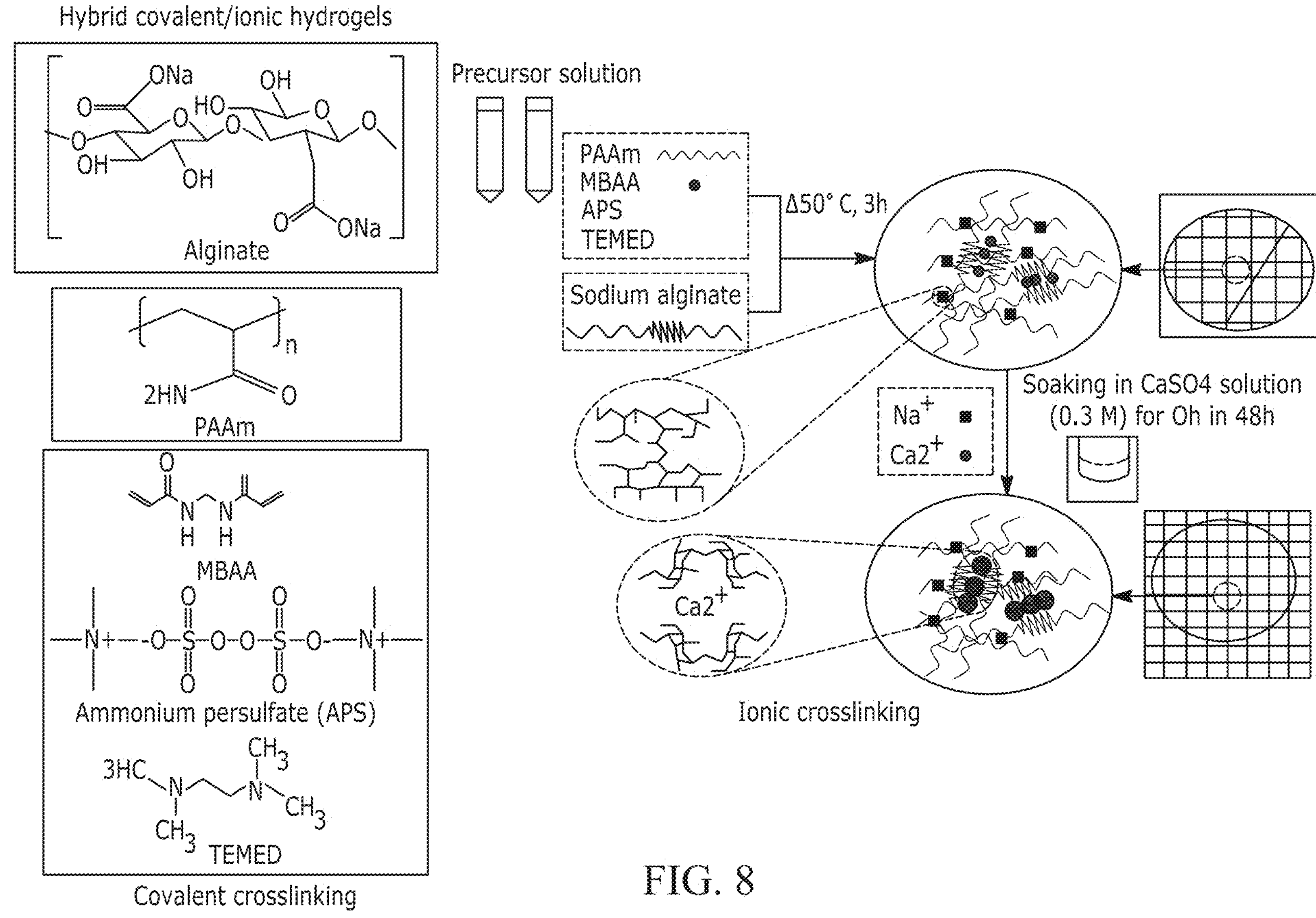
FIG. 8 is a schematic illustration of a synthesizing process for one example hydrogel.
Figure 9C:
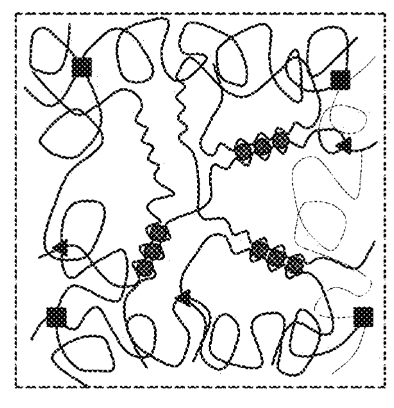
FIG. 9C is a schematic illustration of the chemistry of a bis-acrylamide crosslinker in expandable hydrogels.
Figure 9B:
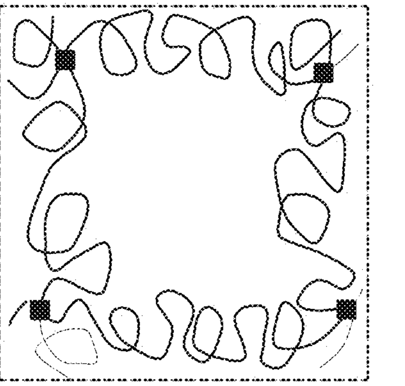
FIG. 9B is a schematic illustration of the chemistry of covalent polyacrylamide.
Figure 9A:
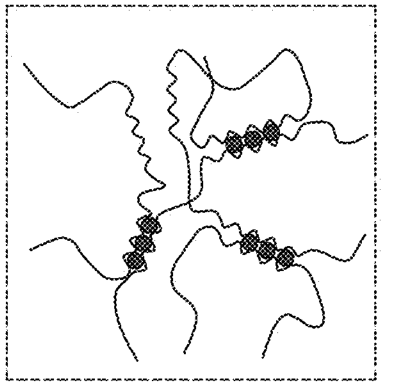
FIG. 9A is a schematic illustration of the chemistry of ionic alginate.
Figure 9D:
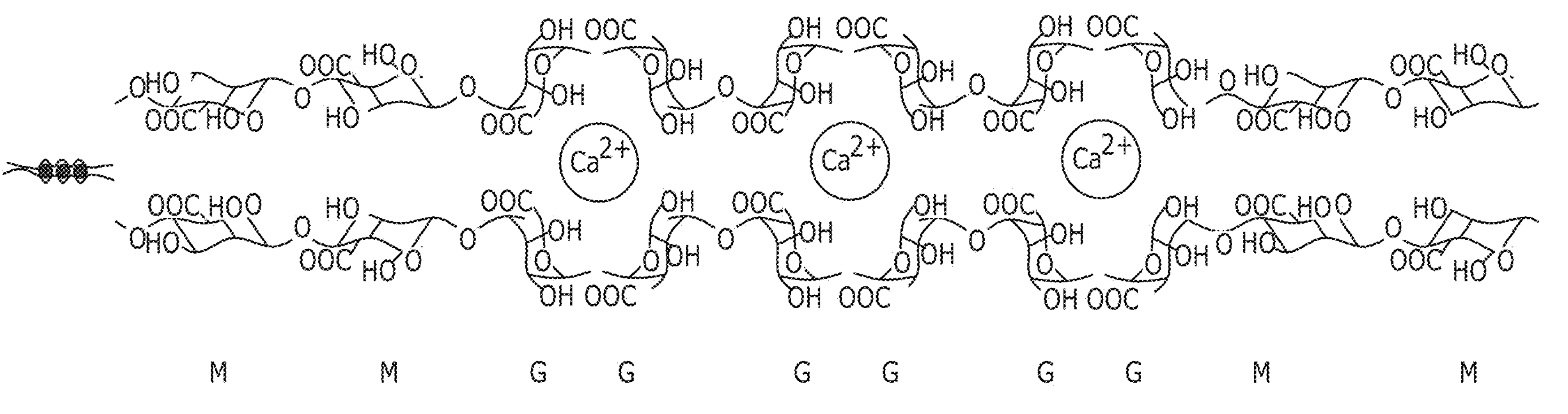
FIG. 9D is a schematic illustration of a synthesized hybrid polyacrylamide/alginate hydrogel.
Figure 9D:
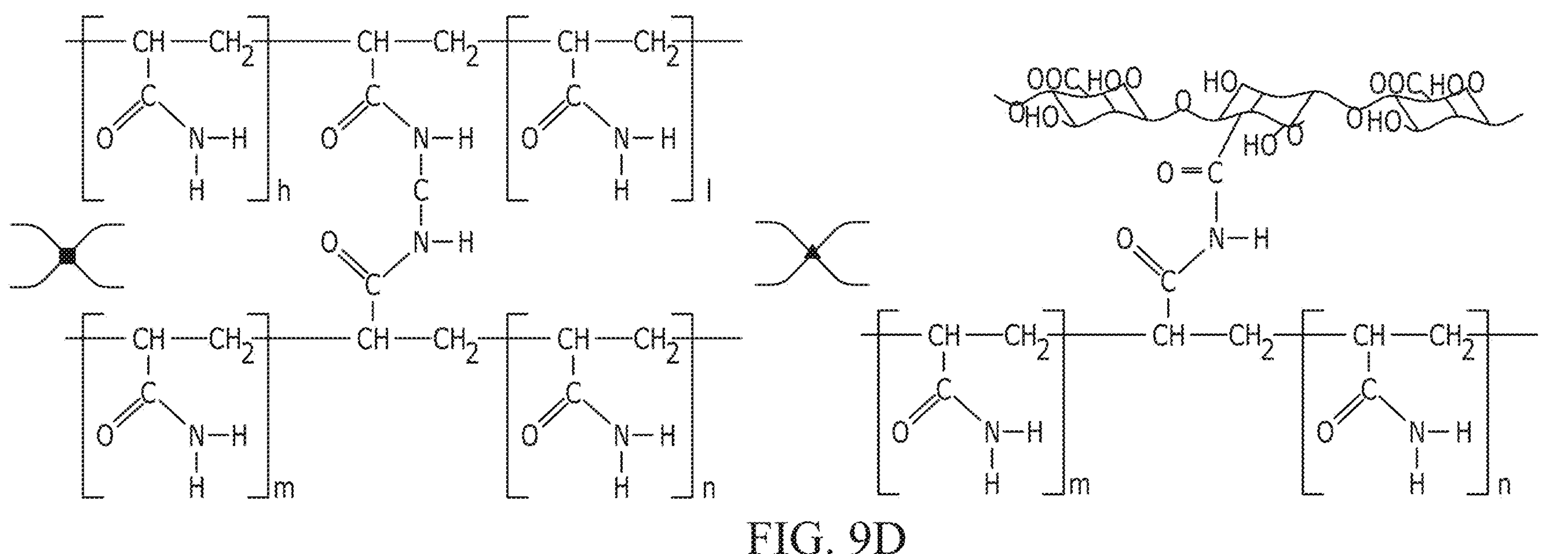
Figure 9E:
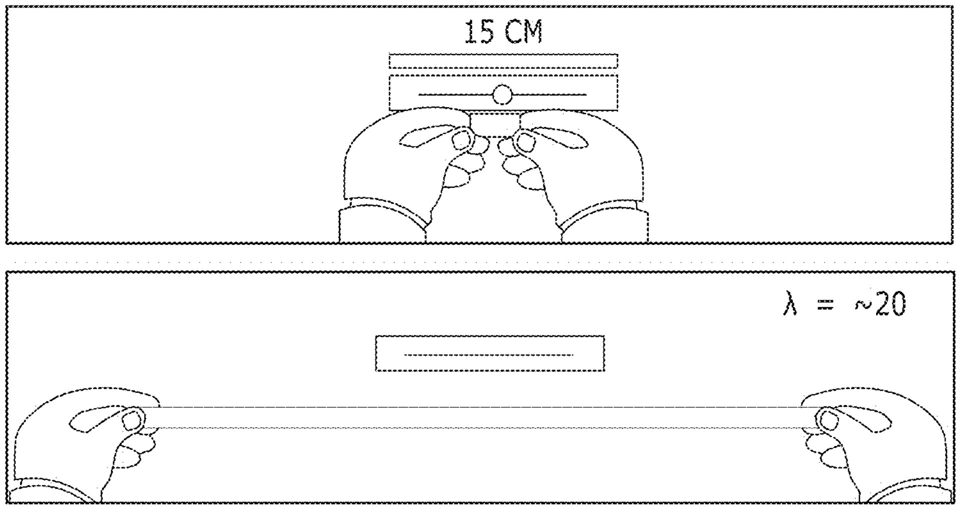
FIG. 9E depicts photographs of linear stretching of the hydrogel.
Figure 9F:
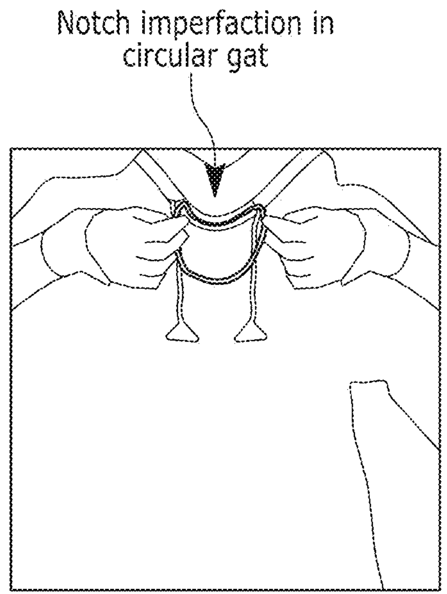
FIG. 9F depicts photographs of linear stretching an imperfect hydrogel.
Figure 9F:
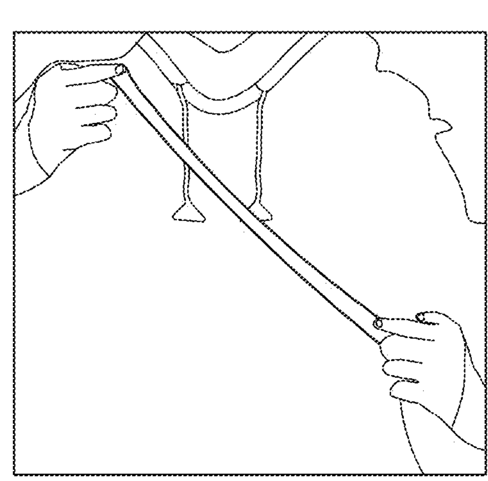

While future studies will focus on improving hydrogel elongation while maintaining appropriate substrate stiffness, the data indicated that elastic modulus and yield strength for 3-48 hours of immersion time were significantly larger than that of corresponding samples immersed for 15 min, which differed from literature methods. With this in mind, the specific synthesis of the Alginate/PAAm hybrid covalent/ionic hydrogels is illustrated in FIGS. 8-9D. The hybrid hydrogel produced was capable of generating ~20× of linear stretch (λ=~20) compared to the unstressed state.

Expansion Microscopy

Figure 10:
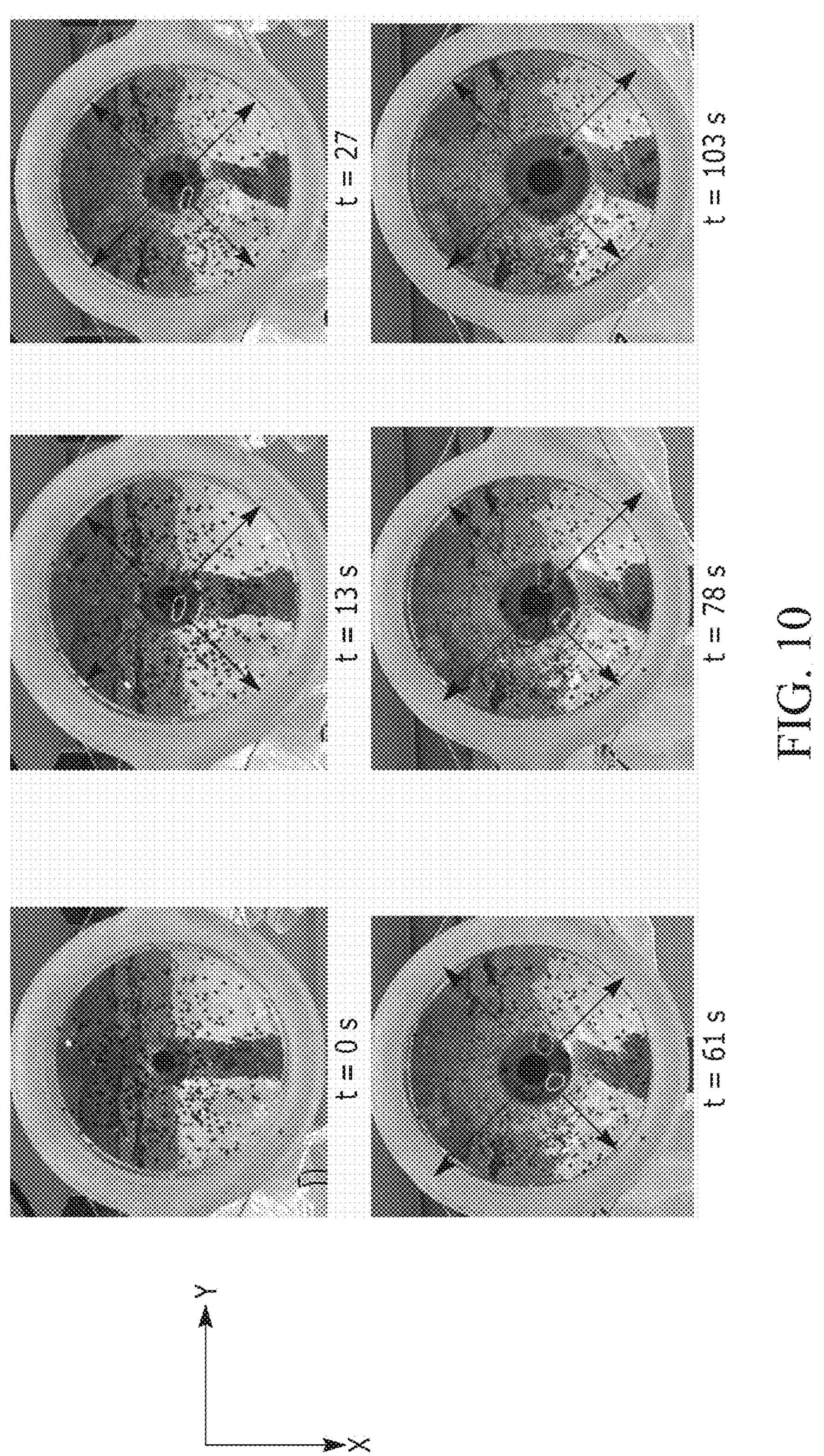
FIG. 10 depicts photographs of the biological sample within the expanded hydrogel at various expansion times.
Figures 11A, 11B, 11C:
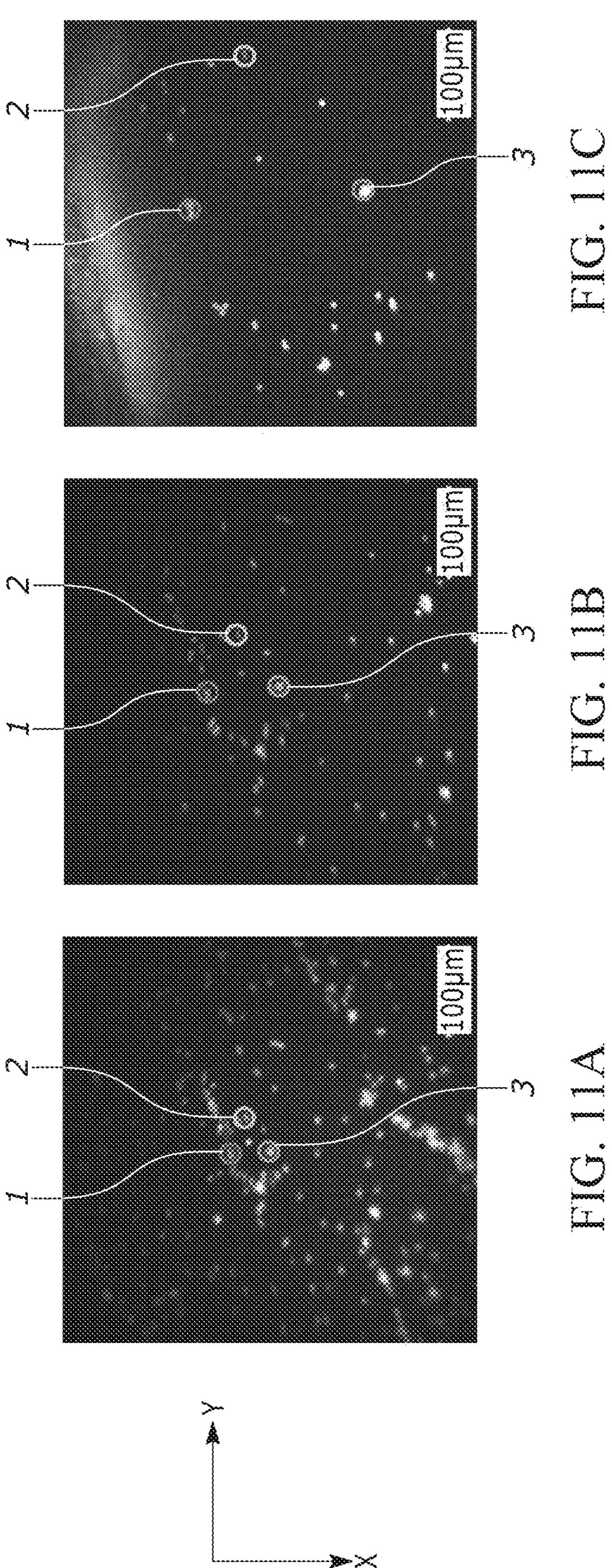
FIGS. 11A-11C are microscopy images of the hydrogel at increasing degrees of expansion.

The motors 30 were actuated to vertically move the platform ~1.3 mm/s in a non-continuous manner. Photos were taken periodically as the platform raised the hydrogel (see FIG. 10). In particular, photos were taken from time t=0 to time t=103 s. As shown in the time progression, the sample cells indicated gradually spread radially outward as the hydrogel was equibiaxially stretched. At the same, time microscopic images were taken of the hydrogel expansion as shown in FIGS. 11A-11C. The stretching/expansion occurred until the tracked cells moved radially outside of the field of view of the microscope camera.

Results

Figure 11D:
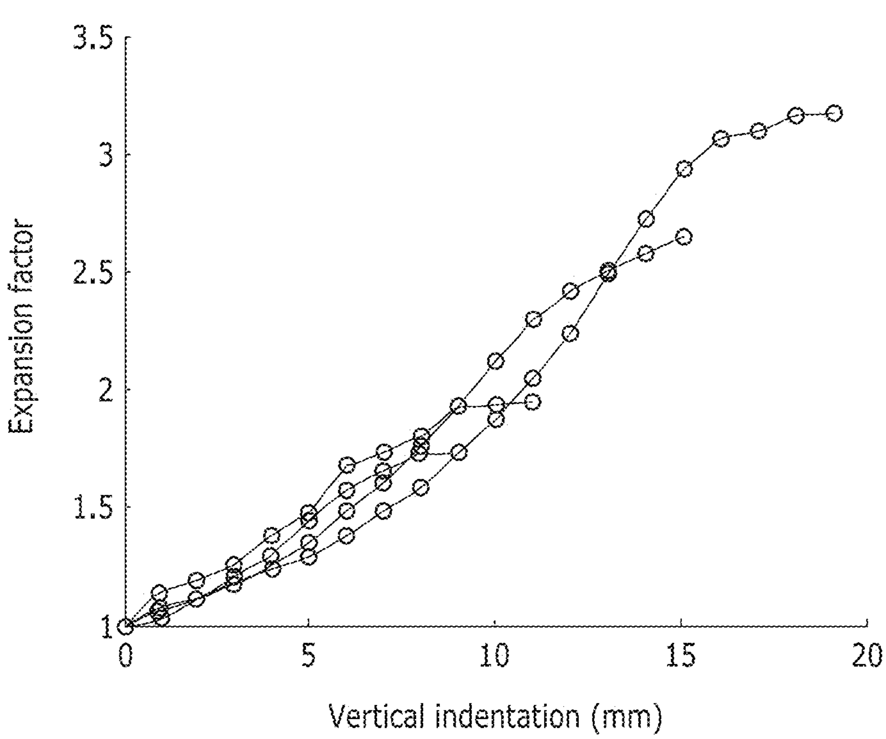
FIG. 11D is a graph plotting the expansion factor of the hydrogel versus the vertical indentation of the indenting cylinder.

Expansion of a 30 mm diameter hydrogel 70 was plotted against the vertical indentation created by the cylinder 82 (FIG. 11D). The hydrogels 70 were secured with screws through them and there were no signs of the hydrogels tearing or the holes having adverse effect on stretching. Data was plotted until the hydrogels 70 began to dry out. There was a 3 minute pause between each mm of vertical indentation by the cylinder 82. In other words, the motors 30 were actuated to move the platform 50 1 mm vertically, the motors were stopped for 3 minutes, and then the process repeated.

Figure 12A:
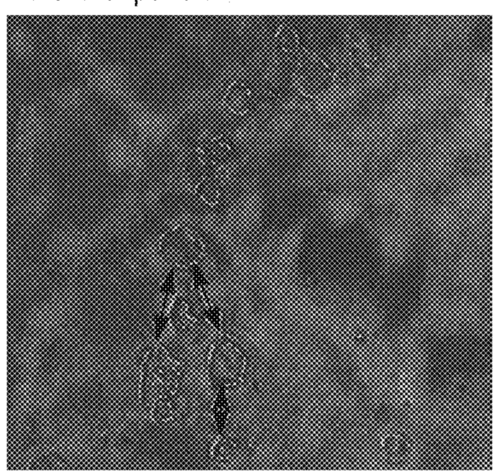
FIG. 12A is a microscopy image of biological cells in a hydrogel before expansion of the hydrogel.
Figure 12B:
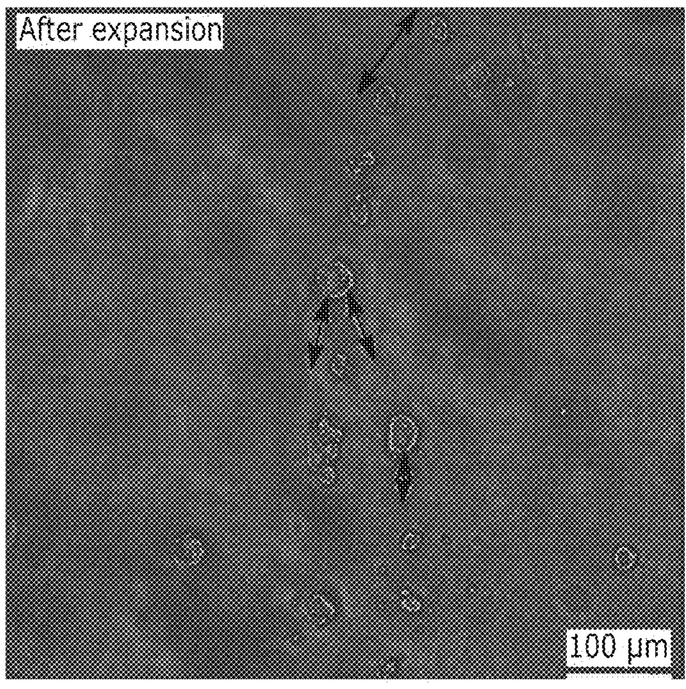
FIG. 12B is a microscopy image of the biological cells of FIG. 12A after hydrogel expansion.

None of the features tracked were close to leaving the indenting ring. A panel of images showing beads stretching to ~6.5× expansion were taken from a video of hydrogel stretching continuously on the indenting cylinder 82 with a Delrin indenting ring (not Teflon) and was secured using screws. Frames were taken when the beads were in focus. From left to right the image was taken at 30 mm (FIG. 11A), 60 mm (FIG. 11B), and 120 mm (FIG. 11C) of vertical indentation, with individual cells indicated at ①②③ in each figure. Preliminary results of the hydrogel expansion supports the idea that cells within the sample can be drawn further apart from one another as the hydrogel transitions from a pre-expansion (FIG. 12A) to a post-expansion condition (FIG. 12B). The arrows within FIGS. 12A-12B indicate the directions of expansion of individual cells. The experiment revealed that equibiaxial expansion was accomplished with expansion factors achieved comparable to osmotic E×M (linear 3.5×) with a maximum observed area expansion factor of ~6.5× (linear ~2.5×).

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A stretcher device configured for use with an optical microscope, the device comprising:

a platform defining an opening configured to receive a hydrogel containing a biological sample;

an indenting cylinder axially aligned with the opening;

at least one actuator connected to the platform for moving the platform relative to the indenting cylinder such that the indenting cylinder stretches the hydrogel and thereby stretches the biological sample.

2. The device recited in claim 1, wherein the at least one actuator comprises a linear actuator that translates the platform axially relative to the indenting cylinder.

3. The device recited in claim 1, wherein the at least one actuator comprises a motor that cooperates with a threaded rod to translate the platform axially relative to the indenting cylinder.

4. The device recited in claim 1, wherein the at least one actuator comprises a pair of motors that cooperate with a pair of threaded rods to translate the platform axially relative to the indenting cylinder.

5. The device recited in claim 1, wherein the at least one actuator moves the platform such that the hydrogel is biaxially stretched.

6. The device recited in claim 5, wherein the at least one actuator moves the platform such that the hydrogel is equibiaxially stretched.

7. The device of claim 1, wherein an objective of the microscope is focused on the hydrogel at an end of the indenting cylinder.

8. The device of claim 1, wherein the hydrogel is stretchable and cytocompatible.

9. The device of claim 8, wherein the hydrogel has a Young's Modulus about 1 kPa to about 150 kPa and an elongation (% strain) at fracture of at least about 400%.

10. The device of claim 9, wherein the hydrogel is ionically and covalently crosslinked.

11. The device of claim 1, wherein the hydrogel comprises an ionically crosslinked alginate and a covalently crosslinked polyacrylamide.

12. The device of claim 1, wherein the biological sample includes a plurality of cells cultured in the hydrogel and which are visualized by the optical microscope upon expansion of the hydrogel.

13. A method of visualizing a biological sample, the method comprising:

providing the biological sample in a hydrogel;

positioning the hydrogel on a stretcher device configured to be mounted on an optical microscope;

biaxially stretching the hydrogel with the stretcher device and thereby stretching the biological sample; and visualizing the stretched biological sample with the optical microscope.

14. The method of claim 13, wherein the hydrogel is equibiaxially stretched.

15. The method of claim 13, wherein the stretcher device includes a platform defining an opening configured to receive the hydrogel, an indenting cylinder axially aligned with the opening, and at least one actuator connected to the platform, and wherein the at least one actuator is actuated to axially move the platform relative to the indenting cylinder such that the indenting cylinder biaxially stretches the hydrogel and thereby stretches the biological sample.

16. The method of claim 15, wherein the at least one actuator comprises a pair of motors and biaxially stretching the hydrogel comprises actuating the pair of motors to axially move the platform.

17. The method of claim 13, wherein the hydrogel has a Young's Modulus about 1 kPa to about 150 kPa and an elongation (% strain) at fracture of at least about 400%.

18. The method of claim 13, wherein the hydrogel is ionically and covalently crosslinked.

19. The method of claim 13, wherein the hydrogel comprises an ionically crosslinked alginate and a covalently crosslinked polyacrylamide.

20. The method of claim 13, wherein the biological sample includes a plurality of cells cultured in the hydrogel and which are visualized by the optical microscope upon expansion of the hydrogel.

* * * * *